United States Patent [19]

Kolarov et al.

[11] Patent Number: 5,737,313
[45] Date of Patent: Apr. 7, 1998

[54] DESIGN OF A CLOSED LOOP FEED BACK CONTROL FOR ABR SERVICE

[75] Inventors: Aleksandar Kolarov, Plainsboro; Gopalakrishnan Ramamurthy, Cranbury, both of N.J.

[73] Assignee: NEC USA, Inc., Princeton, N.J.

[21] Appl. No.: 616,389

[22] Filed: Mar. 15, 1996

[51] Int. Cl.$^6$ ............................................. H04L 12/26
[52] U.S. Cl. ........................... 370/234; 370/236; 370/468
[58] Field of Search ................................ 370/229–238, 370/395, 465, 468

[56] References Cited

U.S. PATENT DOCUMENTS 5,633,859  5/1997  Jain et al. ........................... 370/234

OTHER PUBLICATIONS

Kai-Yeung Siu and Hong-Yi Tzeng, "Intelligent Congestion Control for ABR Service in ATM Networks," Computer Communication Review, vol. 24, No. 5, pp. 81–106, Oct. 1995.

Andreas Ptisillides et al., "Integrated Control of Connection Admission, Flow Rate, and Bandwidth for ATM based Networks," INFOCOM '96, vol. 2, pp. 785–793, 1996.

Michael Ritter, "Network Buffer Requirements of the Rate-Based Control Mechanism for ABR Services," INFOCOM '96, vol. 3, pp. 1190–1197, 1996.

*Primary Examiner*—Melvin Marcelo
*Attorney, Agent, or Firm*—Philip J. Feig

[57] ABSTRACT

A rate based feedback congestion control at an ATM switch for ABR vservice is based upon the state of the switch queue fill. Individual ABR virtual channels are informed of an explicit rate at which the virtual channels are allowed to transmit cells.

22 Claims, 12 Drawing Sheets

DESIGN OF A CLOSED LOOP FEED BACK CONTROL FOR ABR SERVICE

FIELD OF THE INVENTION

The present invention relates to ATM networks and specifically to available bit rate (ABR) service of ATM networks.

BACKGROUND OF THE INVENTION

The ATM Forum has defined a new service class known as the Available Bit Rate Service (ABR). Users of this service dynamically share the available bandwidth in an equitable manner. While the service does not provide strict guarantees on Quality of Service (QoS), it should attempt to minimize the cell loss at the expense of delay. The dynamic sharing of bandwidth between competing users has to be achieved by means of an appropriate set of distributed controls. An end-to-end rate based feedback control scheme has been adopted, where the sources adapt their rates based on the feedback they receive about the state of the network. Two methods have been adopted for conveying the state of the network back to the sources. In the Explicit Forward Congestion Indication method (EFCI), a single bit in the header of each ATM cell is used to indicate if a switch in a virtual channel (VC) path is congested or not. If one or more switches in a VC's path is congested, the destination determines this information from the received ATM cell headers and then signals the source through a special control or resource management (RM) cell. In the Explicit Rate (ER) method, instead of a single bit feedback, the switches explicitly specify the maximum rate each VC is allowed to use. The switches compute this rate for each VC, based on the state of its buffer, the available link capacity for ABR service, the number of active VC's, and the like.

The control mechanism for ABR service must be capable of operating across wide area networks (WAN), where the propagation delays can be large. However, the effectiveness of feedback control schemes is limited by the latency of the feedback loop. In particular, when VCs traverse several intermediate nodes, extreme unfairness can result. VCs whose feedback delays are smaller and thus have more up-to-date information can have unfair advantage over VCs that have larger feedback delays. In a wide area network, the latency of the feedback loop coupled with the fact that the amount of buffers at each node can be less than the bandwidth delay product of the route, can lead to significant degradation in network performance.

Many different control schemes have been proposed for the computation of the Explicit Rate.

In the Adaptive Proportional Rate Control (APRC) scheme the switch monitors the value of the Allowed Cell Rate (ACR) contained in each Resource Management (RM) cell in the forward direction and computes a moving average of the ACR values, called MACR. If the switch is congested and the ACR of a VC is larger than the current value of the MACR at the switch, it sets the explicit rate for this VC as MACR. This value is set in the RM cell when it travels in the reverse direction. The condition that determines when a switch is congested is implementation dependent.

In the Congestion Avoidance using Proportional Control (CAPC) scheme the concept is to select a target rate $R_0$ at which the switch should operate. To achieve this target rate, proportional feedback control is used using explicit rates.

The method requires that the total input rate $R_{in}$ from all ABR VCs, and the available capacity or target rate $R_0$ be measured in real time. A rate adjustment factor $\delta$ is computed as:

$$\delta = 1 - R_{in}/R_0$$

If $\delta > 0$, the current explicit rate ER is increased as:

$$ER = \min(ERU, 1+\delta R_u)ER$$

where ERU is typically 1.5, and $R_u$ is typically 0.025 to 0.01.
If $\delta \leq 0$, the current explicit rate is decreased as $$ER = ER \cdot \max(ERF, 1+\delta R_d)ER$$

where ERF=0.5 and $R_d$=0.2 to 0.8.

When the switch receives an RM cell traveling in the reverse direction, the ER field is updated to the minimum of the ER value in the RM cell and the explicit rate computed by the switch. In addition, if the queue exceeds a given threshold a Congestion Indication (CI) bit is also set.

In the Explicit Rate Indication for Congestion Avoidance (ERICA) scheme the switch computes an overload factor as follows $$\text{Overload} = N/(TU/C)$$

where T is the time necessary for N ABR cells to arrive at the switch, U is a target utilization and C is the available capacity for ABR. The scheme also computes a fairness index as follows:

$$FS = \text{Target\_Cell\_Rate}/\text{Number\_of\_Active\_VC}$$

where the Target_Cell_Rate=UC. The number of active VCs is the number of VCs seen transmitting during the last measurement interval of T.

The explicit rate for VC i is computed as:

$$ER(i) = \max(FS, CCR(i)/\text{Overload\_Factor})$$

where CCR(i) is the most recent value of ACR for VC i that the switch knows.

The State Dependent Feed Back Control Scheme is a rate control scheme that computes the rate based on the current queue fill as well as the rate at which the queue is increasing.

The main drawback of the first three schemes is that the control schemes are based on heuristics and depend on a number of measurements that are either difficult to perform or have a significant amount of noise in their estimates. Filtering out the noise will result in a sluggish response, with higher cell loss and lower link utilization. These proposals for ABR control are also pure rate based control schemes that do not consider the state of the buffer. Since the input rate is not always less than the output rate, in the long run the queue length can grow slowly and overflow. This is avoided by limiting the target utilization to a predetermined value, for instance 95%, as well as keeping track of the number of active users. Noise free estimates are required in order to have stable control.

It is yet to be proven that in a more realistic environment, a good performance will be achieved based on these noisy estimates. In the fourth scheme a single, second order filter is used. While this scheme makes use of the queue length information, a single filter can provide either a good steady state response or a good transient response, but not both.

The design of a good control mechanism must satisfy the following competing requirements.

1. Stable and Robust behavior.
2. Operate over a range of feedback delays (typically 0 msec to 50 msec) without changing control parameters.
3. Exhibit good transient and steady state behavior. Fast rise times and quick settling times with very little oscillations in the steady state.

4. High utilization with very low cell loss.
5. Use minimal information to control the system.
6. Avoid additional measurements and noisy information.
7. Do not depend on information supplied by the source.
8. Simple implementation.
9. Low computational overhead.
10. Eliminate extensive processing every time an RM cell is received.
11. Handle minimum rate guarantees (MCR>0) without additional computation.

A new transmission is initiated by a source by sending an RM cell followed by data cells. The rate at which the source is allowed to transmit is denoted by the Allowed Cell Rate (ACR). Initially, the ACR is set equal to an Initial Cell Rate (ICR) whose value has to be negotiated with the network. The source will continue to send RM cells after every ($N_{RM}$−1) data cells are transmitted. Before transmitting an RM cell, the source places its current value of ACR in the Current Cell Rate (CCR) field of the RM cell, and the rate at which it wishes to transmit (usually the Peak Cell Rate (PCR)) in the Explicit Rate (ER) field of the RM cell. The RM cell travels in the forward direction through the network, providing the switches in its path with information about the state of the source. The switches can use this information to determine the bandwidth allocation between the competing ABR connections. Once the RM cell reaches the destination, the destination turns the RM cell around and sends it back to the source. Before returning the RM cell, the destination can modify the ER field to a lower value if necessary. On its return journey, each switch in the path of the RM cell can reduce the value in the explicit rate field of the RM cell to a value that the switch can support. The switches can also modify two other bits, the Congestion Indication (CI) bit and the No Increase (NI) bit. Thus, when the RM cell returns to the source, the ER field in the RM cell indicates the rate that can be supported by the most congested switch in the VC's path. The source first reduces its rate ACR by a pre-negotiated fraction if the CI bit is set. If the resulting ACR is larger than the rate contained in the ER field of the last received RM cell, it sets its rate ACR to the value ER contained in the ER field of the RM cell. Alternatively, if the CI or the NI bit is not set and the current rate ACR is less than the rate specified by the ER field, the source increases its rate ACR by a fixed amount AIR (allowed increase in rate, that has been pre-negotiated), with the constraint that the new value of ACR is always less than or equal to the rate contained in the ER field of the RM cell. Thus, the train of RM cells provide a mechanism to convey the rate computed by the switches back to the source.

The present invention provides a novel method for computing the Explicit Rate at a switch.

SUMMARY OF THE INVENTION

All of the control mechanism requirements can be met by employing the teachings of the present invention. The control parameters can be designed to be stable in a control theoretic sense. Further, the minimal implementation of this control has the following important attributes:

1. The control uses only ONE primary measure, namely the queue length, to exercise the control.
2. The Explicit Rate is computed only once every $T_S$ millisecond. This has an important affect on the processing overhead placed on the switch controller. That is, the queues are read and the explicit rate computed only once every $T_S$ milliseconds, as opposed to prior art schemes that read the queues and compute the explicit rate every RM cell arrival. For example, at 150 mbits/sec, the value of $T_S$ can be 1 msec.
3. The proposed control achieves Max/Min fairness in a natural way, without any additional computation or information concerning bottleneck rate values.
4. The proposed control provides guarantees on minimum cell rate (MCR>0) without any additional computation.

A principal object of the present invention is therefore, the provision of a method of implementing a rate based feedback congestion control at an ATM switch for ABR service where based on the state of the switch queue fill, ABR virtual channels are informed of an explicit rate at which they may transmit data.

Another object of the invention is the provision of a method of computing the explicit rate at an ATM switch for ABR control.

A further object of the invention is the provision of a high gain and a low gain second order proportional differential controller for computing the explicit rate.

Further and still other objects of the present invention will become more clearly apparent when the following description is read in conjunction with the accompanying drawing.

DETAILED DESCRIPTION OF THE INVENTION

Figure 1:
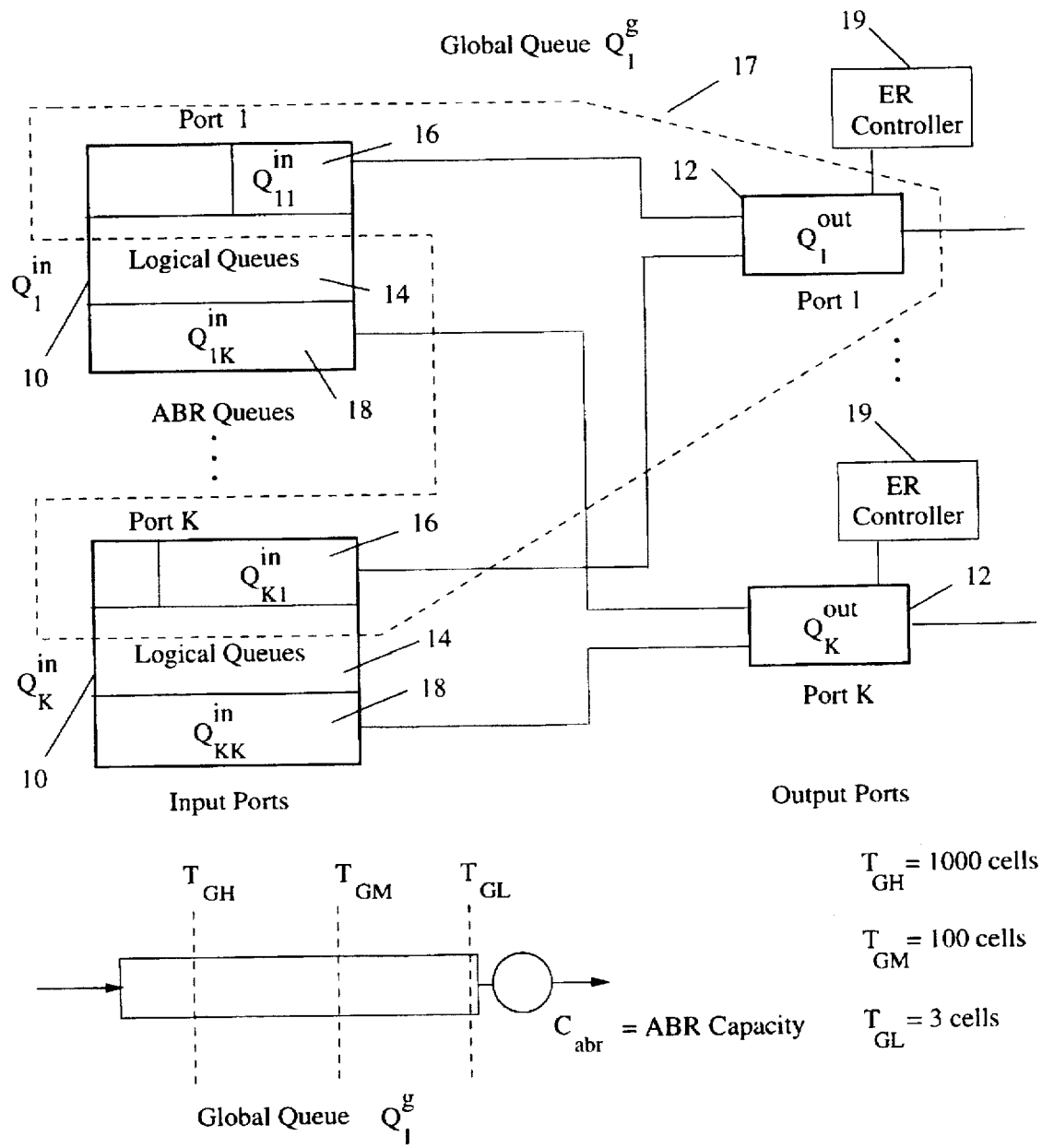
FIG. 1 is a schematic representation of an input and output buffered switch.

Referring now to the figures and to FIG. 1 in particular, there is shown a schematic representation of a preferred input and output buffered switch which will be used in the following description as a reference model. The switch has K input ports 10 (referred to as $Q_p^{in}$) and K output ports 12 (referred to as $Q_q^{out}$). The buffers associated with each input port have K logical queues 14 for ABR traffic, with a logical queue 16,18 for each output port. At a given input port p(p=1,2, ... ,K) logical queue $Q_{pq}^{in}$ queues ABR cells that have to be switched to output port q(q=1,2, ... ,K). The total number of ABR cells $N_p^{in}$ at input port p at any given time is given by $$N_p^{in} = \sum_{q=1}^{K} N_{pq}^{in}.$$

With respect to a specific output port $q(q=1,2,\ldots,K)$, the global queue $Q_q^g$ (FIG. 1, 17) is defined as comprising all cells waiting to be transmitted through output port q. The number of ABR cells $N_q^g$ in global queue $Q_q^g$ is given by $$N_q^g = \sum_{p=1}^{K} N_{pq}^{in} + N_q^{out},$$

where $N_{pq}^{in}$ is the number of ABR cells in input port "p" waiting to be switched to output port "q" and $N_q^{out}$ is the number of ABR cells in the output queue $Q_q^{out}$ of port "q". Note that $Q_q^g$ is a global queue of all ABR cells that will be transmitted through output port "q".

Associated with each output port $q(q=1,2,\ldots,K)$ is an explicit rate controller 19 that determines the rate of each ABR VC, switched through output port $q(q=1,2,\ldots,K)$. For example, the explicit rate for output port q is determined by keeping track of the number of ABR cells $N_q^g$ in the global queue $Q_q^g$ associated with output port q.

Figure 2:
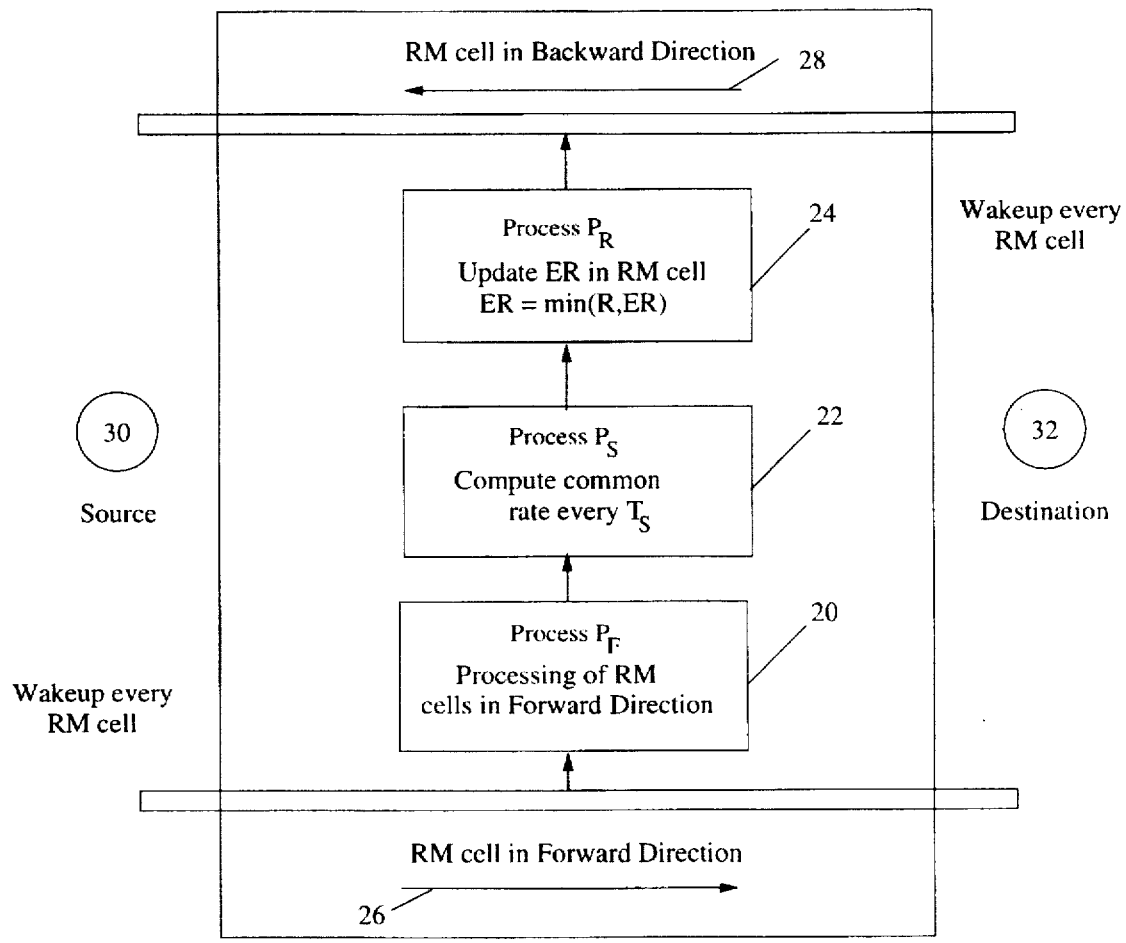
FIG. 2 is a flow diagram of the processing performed by the explicit rate controller
Figure 3:
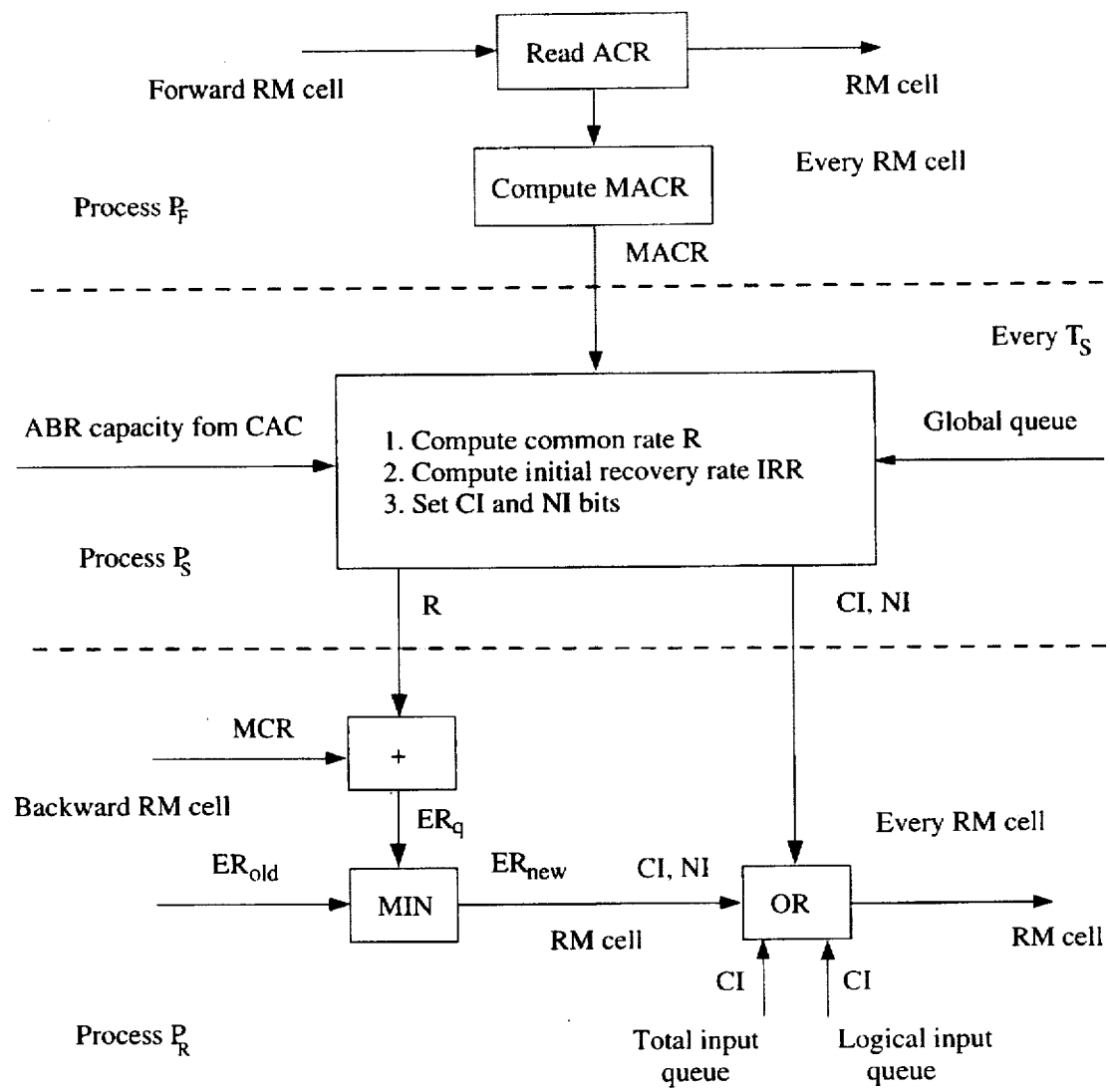
FIG. 3 is a flow diagram of the explicit rate and CI/NI bit marking process.

Referring to FIG. 2 and to FIG. 3, there are three main functions to be performed by the explicit rate controller 19 at each output port 12 of a switch that supports ABR service. These functions are:

1. Processing of the resource management cell (RM) cell from a source in the forward direction 20, referred to as Process $P_F$.
2. Processing the state of the global queue associated with a given output port to determine the Explicit Rate for ABR VCs using the given output port 22, referred to as Process $P_S$.
3. Processing of the RM cell in the backward direction to write the explicit rate ER into the RM cell, as well as to modify the CI and NI bits in the backward RM cell 24, referred to as Process $P_R$.

Any of the three processes, $P_F$, $P_S$ and $P_R$, can be implemented in hardware, software or in a combination of hardware and software.

The process $P_F$ processes the RM cell traveling in the forward direction 26 from a source 30 VC to a destination in 32. Processing of this information is performed logically with respect to the respective output ports (see FIGS. 2, 3 and 11). Since the reference switch model in FIG. 1 is input/output buffered, the processing has to be performed at a location that combines the information from all RM cells, from all input ports, and that are traveling to a particular output port. Alternatively, the process may be implemented at each output port. The process $P_F$ reads the ACR field of each RM cell in the forward direction and uses a first order filter to determine a moving average of the ACR value reported by all RM cells of all VCs to a given output port. This information is then used by the process $P_S$ (described below) to determine a value for the Initial Recovery Rate (IRR) when the global queue associated with the given output port reaches overload.

Figure 12:
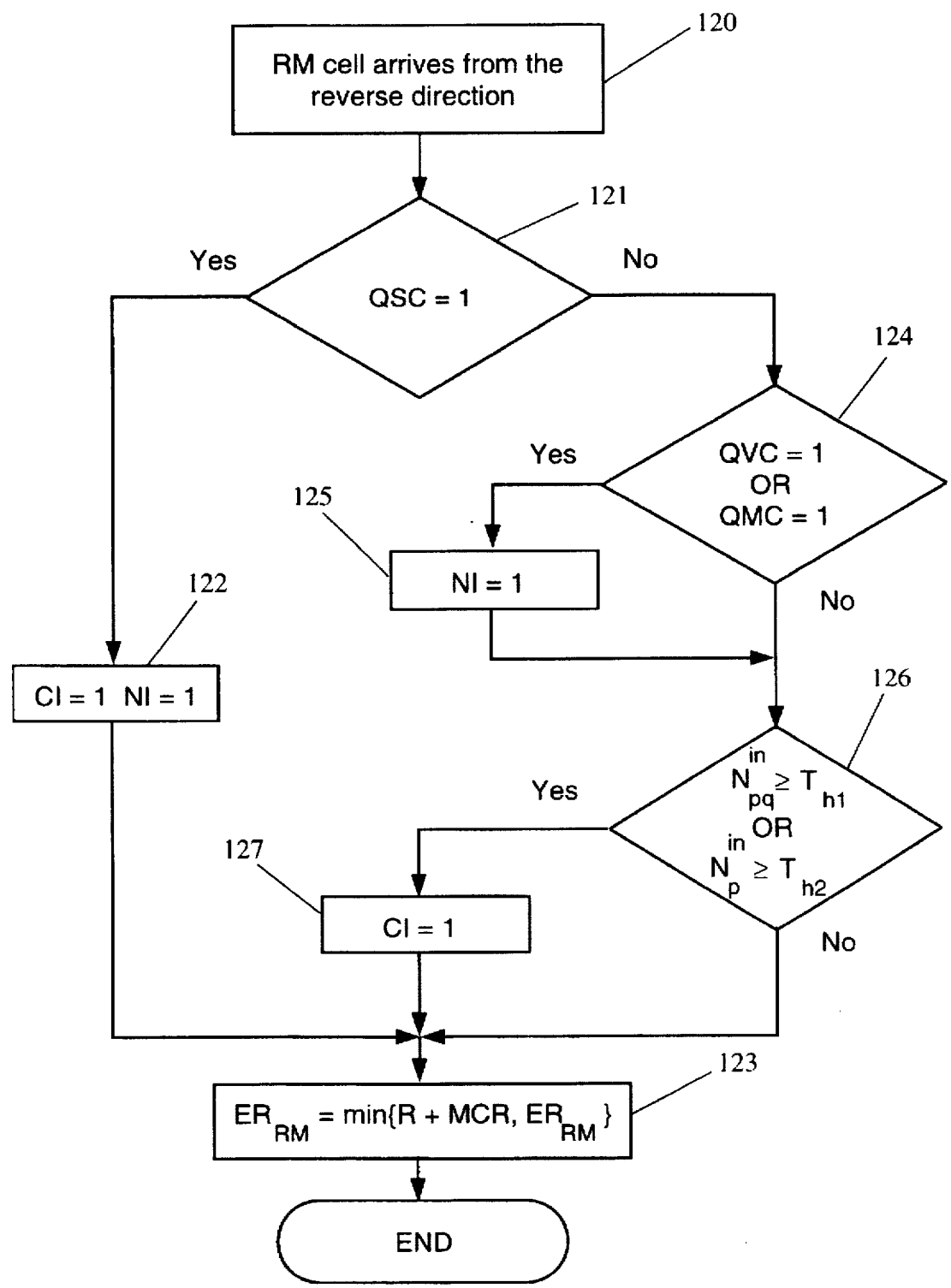
FIG. 12 is a flow diagram of a method for RM cell processing in the reverse direction.

The process $P_R$ processes the RM cell traveling in the backward direction 28 from the destination 32 back to source 30 by stamping the Explicit Rate $ER_q(i)$ in the RM cells and setting the congestion indicator (CI) bit and the no increase (NI) bit in the RM cell (see FIGS. 2, 3 and 12). The CI bit for a VC is set if the global queue exceeds a threshold $T_{GH}$, or if the corresponding logical queue $Q_{pq}^{in}$ at the input port p exceeds a threshold $T_{h1}$ or the combined ABR queue $Q_p^{in}$ at input port p exceeds the threshold $T_{h2}$.

The process $P_S$ executes the control law that determines the common rate $R_q(t)$ for all ABR VCs using port "q" at time "t". The explicit rate $ER_q(t,i)$ for ABR VC "i" of port "q" at time "t" is determined from the common rate $R_q(t)$.

The process $P_S$ has a basic timing cycle of $T_S$ milliseconds. The value of $T_S$ depends upon whether the control process is implemented in hardware or software. The preferred value for $T_S$ is of the order of 1 millisecond. While the process $P_S$ can throttle all VCs, it attempts to increase the rate of only those VCs that are bottlenecked at the current switch. Once every $T_S$ milliseconds, process $P_S$ wakes up, executes the control law and computes the common rate $R_q(t)$ for each output port $q(q=1,2,\ldots,K)$. The actual explicit rate for a particular ABR VC using output port "q" is determined from the common rate $R_q(t)$ of that port by using the process $P_R$ at the time of processing the RM cell traveling in the reverse direction. The Common Rate $R_q(t)$ for output port "q" is computed once every $T_S$ millisecond based on the number of ABR cells $N_q^g$ in the global queue $Q_q^g$. With this basic mechanism, successive RM cells of the same VC will be stamped with the explicit rate ER computed from $R_q(t)$ during a $T_S$ period. The process also determines the setting of the CI and the NI bits. However, secondary control mechanisms can override these settings, as will be described below.

A flow diagram illustrating the above described interaction of the processes $P_R$, $P_S$ and $P_F$ is shown in FIG. 3.

Figure 4:
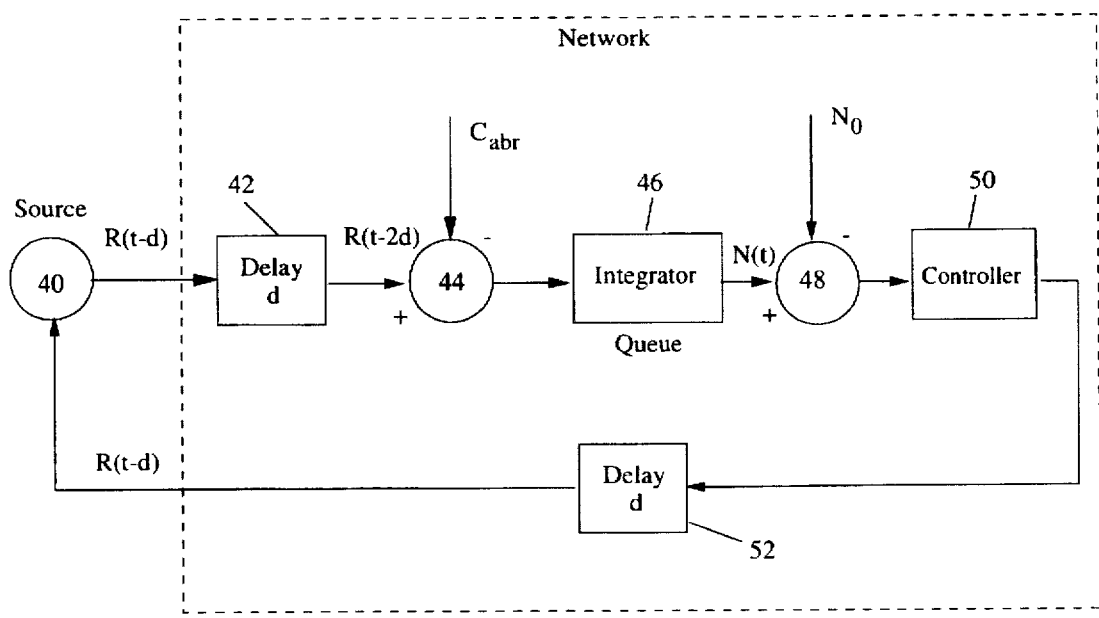
FIG. 4 is a schematic diagram of the network feedback control scheme.

FIG. 4 shows a schematic of a preferred network feedback control scheme. At each switch within the network, the explicit rate is computed based on the global queue fill of the associated output port, via a second order controller, following a Proportional-plus-Derivative (PD) Control Law. The network is modelled as a single queue, with a one direction delay of "d" between a source and the network.

At network node 48, the queue fill N(t) at time t is compared with a reference value $N_0$. The difference between these two values is used as an error signal input to a controller 50. The controller output at time t is rate R(t). The rate R(t) is made to be a value such that it will result in the error signal at the input of controller 50 being zero. The rate R(t) reaches the source 40 after a delay d. The source, upon receipt of the new rate value, changes its transmission rate to the new value at time t−d, i.e. R(t−d). The effect of the changed rate becomes apparent at the network queue after a delay d 42. The difference between the new rate R(t−d) and the available ABR capacity, ($C_{abr}$ measured at comparator 44, is the excess rate at the node). The excess rate at the node undergoes time integration 46 resulting in a value of the queue file N(t) at the network node. The process repeats.

If the excess rate provided at the input of time integrator 46 is a positive value, the queue increases. If the excess rate is a negative value, the queue empties. Thus, by controlling the source rate R(t), the queue fill N(t) at the network node can be maintained at a value close to the reference value $N_0$. This will be the case if the rate R(t) closely follows the available ABR capacity, $C_{abr}$.

In order to better understand the queue fill process, let $T_d^{max}$ be the maximum one way propagation delay between the source and the destination that affects a switch. While the performance of a robust design will not be optimal, it is simpler to implement and more practical under the usual conditions than an adaptive controller that adapts to the propagation delay. The design of a robust controller depends on the propagation delay. It is possible to design an optimal controller for LANs, MANs and WANs separately. It is also possible to design a controller able to perform for round trip propagation delays of tens of microseconds to about 50 milliseconds, which range would include both LANs and WANs. This situation will occur at a given output port when a first VC has a control loop delay of tens of microseconds (LAN connection), while another VC has a control loop delay of tens of milliseconds (LAN-WAN connection).

The control law is executed once every $T_S$ millisecond by process $P_S$. Assume time is slotted and each slot is of length $T_S$ millisecond. Let "t(n)" represent the time at which the nth slot ends and the n+1th slot begins. The control law is executed at time $t(n-1), t(n), t(n+1), \ldots$, where $t(n+1)-t(n) = T_S$, for all "n".

Assume that the current time is t(n). That is, the nth time slot has just ended. At this time the following quantities are known with respect to output port $q (q=1, 2, \ldots, K)$:

1. $N_q^g(n)$—the number of cells in the global queue $Q_q^g$ at time t(n);
2. $N_g^g(n-1)$—the number of cells in the global queue $Q_q^g$ at time t(n-1);
3. $R_q(n-i)$—the common rate for port "q" computed at time $t(n-i-1)$, $i(i=0,1,\ldots J)$ and was in effect during time slot (n-i);

where $J = 2T_d^{max}/T_S$.

The control law can now be written as $$R_q(n+1) = R_q(n) - \alpha_0(N_q^g(n) - N_0) - \alpha_1(N_q^g(n-1) - N_0) - \quad (1)$$

$$\beta_0 R_q(n) - \beta_1 R_q(n-1) - \beta_2 R_q(n-2) \ldots -\beta_J R_q(n-J)$$

where, for $(J=0,1,\ldots,J) N_q^g(n-j)$ is the number of ABR cells in the global queue $Q_q^g$ of output port q, measured at time t(n-j), and $R_q(n+1-j)$ is the common rate computed at time t(n-j) and effective for the interval (n+1-j), and $N_0$ is a buffer set point. Note that this equation only uses past values of queue length and computed rates, and does not require any measure of incoming rate, available capacity, number of users, and the like.

Equation (1) can be rewritten as:

$$R_q(n+1) = R_q(n) - (\alpha_0 + \alpha_1)(N_q^g(n) - N_0) + \alpha_1(N_q^g(n) - \quad (2)$$

$$N_q^g(n-1)) - \beta_0 R_q(n) - \beta_1 R_q(n-1) - \beta_2 R_q(n-2) \ldots -\beta_J R_q(n-J)$$

The coefficients $\alpha_0, \alpha_1, \beta_0, \beta_1, \ldots, \beta_J$ are determined by the poles of the characteristic equation of the closed loop system. The poles are placed appropriately within the unit circle of the complex plane to ensure stability. This way it is possible to ensure that the system is asymptotically stable. Since this equation does not consider the available ABR capacity $C_{abr}$, a common rate is set as:

$$R_q(n) = \min(\max(R_q(n), 0), C_{abr}) \quad (3)$$

The value of $C_{abr}$, the available ABR capacity is not measured but obtained from the call admission controller (CAC) as will be described below.

Once the common rate $R_q(n)$ has been computed, in the simplest case the explicit rate $ER_q(n,i)$ for all ABR virtual channels i, at port q of the given switch, during time slot n can be set equal to $$ER_q(n,i) = R_q(n) \quad (4a)$$

Note that $ER_q(n)$ was computed at time t(n-1). More sophisticated methods for assigning the explicit rate are described below. The explicit rate field in the backward tracking RM cell of VC(i) is set by process $P_R$ as $$ER_{RM}^{new}(i) = \min(ER_q(n,i), ER_{RM}^{old}(i)) \quad (4b)$$

where $ER_{RM}^{old}(i)$ is the value contained in the ER field of the RM cell (i.e., the value set by upstream nodes), and $ER_{RM}^{new}(i)$ is the new value for the explicit rate of VC(i). The value $ER_{RM}^{new}(i)$ is referred to as the advertised rate for VC i.

It is also possible to write the evolution of the global queue as:

$$N_q^g(n) = N_q^g(n-1) + R_0 + \bar{R}_q - C_{abr} \quad (5)$$

where $R_0$ is the cumulative sum of rates of VCs that are bottlenecked at other switches, $C_{abr}$ is the capacity available for ABR at the switch in consideration or locally, and L is the total number of VCs that are locally bottlenecked and thus can be controlled locally. That is, L is the total number of VCs that are not bottlenecked at other switches.

A steady state analysis of this equation (1) and (5) gives $$\bar{R}_q = \frac{C_{abr} - R_0}{L} \quad (6)$$

where L is the number of VCs that are locally bottlenecked. Let M be the total number of all ABR VCs through output port q. Then equation (6) can be written as:

$$\bar{R}_q = \frac{C_{abr}}{M} + \frac{(M-L)C_{abr}/M - R_0}{L} \quad (7)$$

This equation shows that in steady state, if M VCs share a link, then each VC gets 1/M of the available bandwidth. If (M-L) VCs are using less than their share, then the unused portion $((M-L)C_{abr}/M) - R_0$ is equally distributed among the remaining L VCs that are locally bottlenecked. The above is valid if the minimum cell rate requirement for all ABR VCs is zero (i.e., MCR=0).

Equation (4a) for determining the explicit rate $ER_q$ from the common rate $R_q$ is correct if the minimum cell rate MCR=0 for all ABR VCs through the given port. However, if the guaranteed minimum cell rate MCR>0 then the common rate $R_q(n)$ computed above, can be smaller than the minimum cell rate MCR guaranteed for a VC. In this case, the process $P_R$ will override the common rate and set $ER_q(n,i) = MCR(i)$ for the VC i. This will cause the total input rate to exceed the available capacity, which, in turn, will cause the global queue to increase. This, in turn, will reduce the common rate $R_q$. After several iterations of this process, the value will converge to the correct value for $R_q$.

If some VCs have MCR>0, the question arises how the remaining bandwidth (after meeting the MCR>0 requirement is met) is to be shared.

A first method is to share the remaining bandwidth among VCs with MCR=0. In this method, the remaining ABR capacity, after meeting the requirements of VCs with MCR>0 is first shared equally among VCs with MCR=0, in such a way that the share for VCs with a given MCR is always less than or equal to the share of VCs with larger MCR.

Assume that P VCs have MCR=0 and (M-P) VCs have MCR>0. Let the sum of their MCRs be $0 < S_0 \leq C$. Then the advertised rate can be written as:

$$\bar{R}_q = \frac{C_{abr} - S_0}{P} = \frac{C_{abr}}{M} - \frac{S_0 - (M-P)C_{abr}/M}{P} . \quad (8)$$

The above equation suggests that the MCR guarantees will be met first for the M-P VCs. The advertised rate for VCs with MCR=0 will be the remaining capacity after meeting the needs of VCs with MCR>0, equally divided among the remaining P VCs with MCR=0, provided it is less than the smallest value of MCR>0.

At time t(n-1), the explicit rate for VC i at port q is computed as follows:

$$ER_q(n,i) = \max(MCR(i), R_q(n)) \qquad (9)$$

Consider the case when $K_1$ users need an MCR of $R_1$ and $K_2$ users need an MCR of $R_2$ such that:

$$R_1 > R_2 > 0$$
$$R_1 K_1 + R_2 K_2 < C$$
If
$$R_2 > \frac{C - K_1 R_1 - K_2 R_2}{P}$$

then, after meeting the MCR requirements of the $K_1 + K_2$ users, the remaining bandwidth will be equally shared between the $P = M - K_1 - K_2$ users.

The advertised rate in this case would be $$R_q = \frac{C - K_1 R_1 - K_2 R_2}{P}.$$

Alternatively, if $R_2 < R_q$ is given by the above equation, then the advertised rate would be $$R_q = \frac{C - K_1 R_1}{P + K_2} > R_2$$

Thus $K_1$ users will get a rate of $R_1$ and the remaining users will receive a rate $R_q$ given by the above equation. Thus, the control equation ensures the MCR guarantees are met and max/min fairness is maintained. Further, no additional per VC or global computation to support MCR>0 is required.

In a second method, there is an equal sharing of the remaining bandwidth over all ABR VCs. In this method, after meeting the requirements of the M VCs with MCR>0, the remaining ABR capacity is shared equally among all the M VCs.

At time $t(n-1)$, the explicit rate for VC (i) at port q is computed as follows:

$$ER_q(n,i) = MCR(i) + R_q(n) \qquad (10)$$

where the common rate in steady state will converge to $$R_q = \frac{C - S_0}{M},$$

where $S_0$ is the sum of all MCRs.

This scheme obtains max/min fairness, guarantees minimum cell rate, and shares the remaining bandwidth equally, without any additional computation.

In order to understand the max/min and MCR>0 mechanism, consider the case when MCR=0 for all VCs. Assume that all VCs are alike and none of them are bottlenecked at other nodes. That is, all VCs are bottlenecked at the node under consideration. In this case, the computed explicit rate will be common to all VCs using port q of the given switch, and will be equal to the common rate $R_q$. A given output port of a switch informs all sources (using the given output port) of the common rate $R_q$ the sources must use, via the RM train traveling the reverse direction. The switch does not track individual VC rates. If there are multiple switches, the source will transmit at the minimum of all the advertised rates. A given switch broadcasts the same common rate $R_q$ to all VCs using a given output port q of the switch. Now, if some of the VCs use less than this advertised rate, the queue size will decrease. The switch does not track which source is transmitting at the advertised rate and which source is transmitting at a lower rate. If the queue size decreases, the switch computes a new common rate that is larger than the previous common rate (that would ensure the queue averages approximately the buffer set point $N_0$) and broadcasts this rate to all sources. Thus, according to this scheme, if some VCs are bottlenecked, the allowable rate for all VCs will increase. In fact, the total allowed rate $M \times ER_q$ (where M is the total number of VCs) can become greater than the available capacity $C_{abr}$. At this point, the queue is still stable. Now, assume that some of the bottlenecked VCs become capable of transmitting at a higher rate. The total input rate to the switch port will go up and the queue will increase. The switch will now compute a new common rate that is smaller than the previous rate. $R_q(n)$ in equation (3) is the common rate that all VCs will be asked to use. This is NOT the aggregate (total) input rate to an output port.

The controller, based on a single second order controller with low gain, has a very good steady state response in the sense that, in response to an impulse or step input (i.e., a new source becomes active):

1. The oscillations in the source rate (of sources with infinite backlog) almost stops completely.
2. The switch input port buffer queue is nearly empty most of the time.
3. The output buffer queue is nearly full or close to the buffer set point $N_0$.
4. The utilization is approximately 100%, after steady state is reached.

Figure 5A:
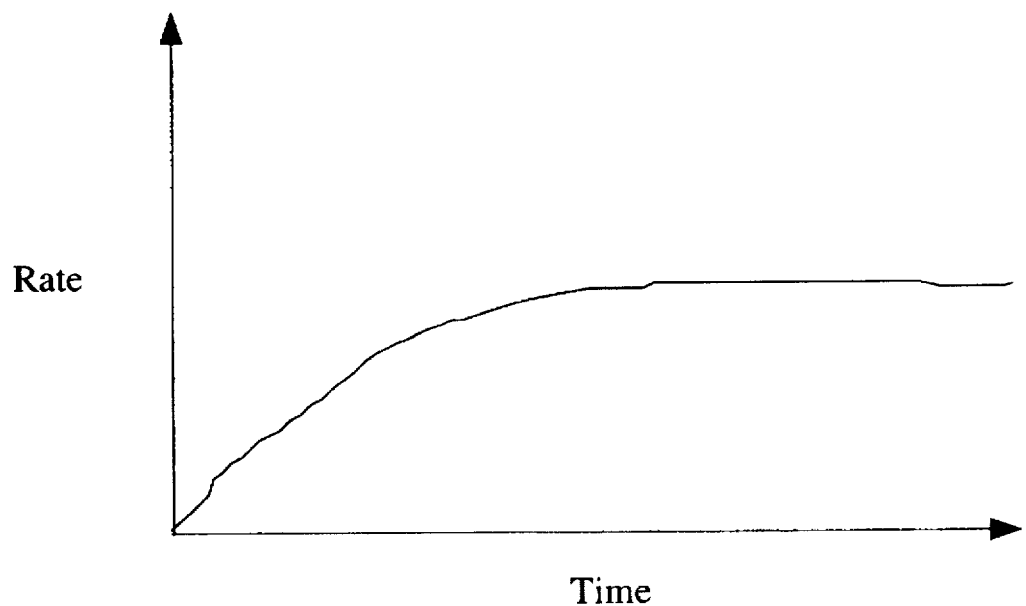
FIG. 5a is a graph of the response of a low gain filter.
Figure 5B:
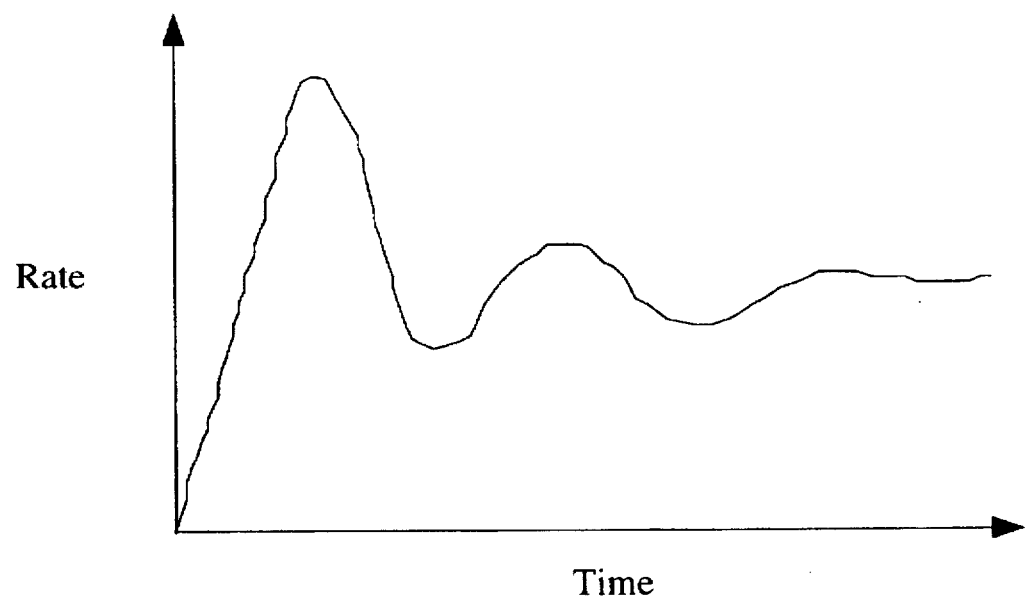
FIG. 5b is a graph of the response of a high gain filter.

However, as shown in FIG. 5a which is a graph of the response of a low gain filter, the rise time is also very large. If the system is initially underloaded, this effect can maintain the cell loss due to buffer overflow very low. However, the same effect will also result in poor response times and link utilization (during the transient phase). Further, when there is a sudden overload, the controller can take a long time to reduce the rate adequately. The latency in response can result in a large cell loss. This is due to the low gain of the controller and the larger number of controller taps. If the gain of the controller is increased, the result is an improved transient response in terms of a fast rise time, but the settling time will also be correspondingly longer, resulting in a poor steady state performance as shown in FIG. 5b which is a graph of the responses of a high gain filter. A single second order controller cannot simultaneously achieve good transient as well as good steady state performance. A transient condition is a result of an overload or an underload, and is a deviation from the normal operating point. Under normal or steady state conditions, if the explicit rate is computed using a low gain controller, when an overload occurs, the low gain controller will not react fast enough to prevent large queue buildup. When a sudden overload is detected, it is necessary to take immediate action by reducing the source rates to an appropriate value. Conversely, if an underload results, the low gain controller will not be able to rapidly increase the source rate.

Figure 6:
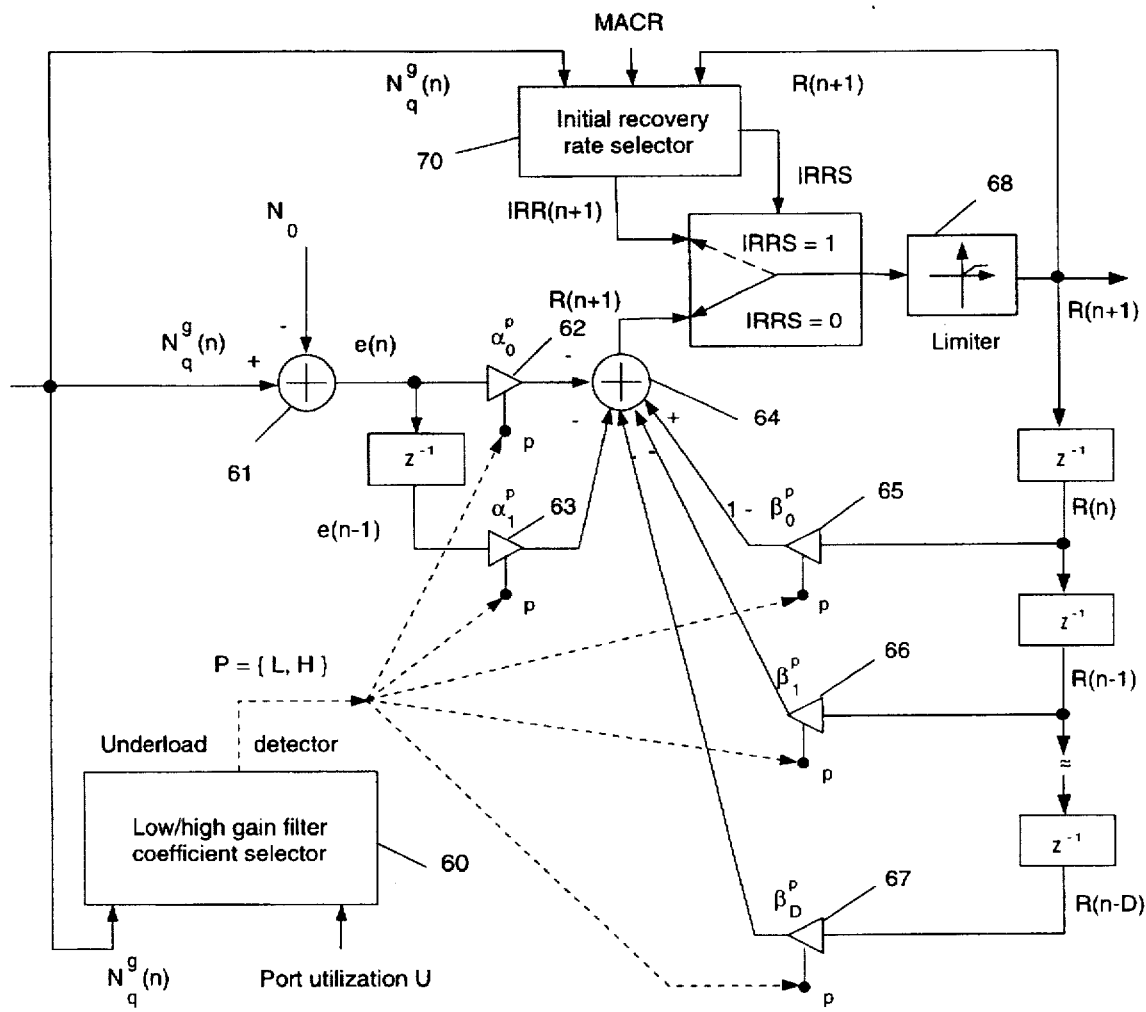
FIG. 6 is a block diagram of a dual proportional-plus-derivative controller.

In order to overcome this problem, preferably two controllers are used in parallel. The first controller is a low gain controller with closed loop poles chosen to have an impulse response without overshoot and a slow rise time having a response similar to that shown in FIG. 5a. This controller is used under steady state conditions. During transients (e.g., new VCs become active or some active VCs become inactive, or the available capacity $C_{abr}$ changes) a second controller is used which is a high gain controller with closed loop poles located such that the impulse response has a fast rise time, at the expense of larger buffer shoot or oscillations having a response similar to that shown in FIG. 5b. In addition to these two controllers, when the operating condition significantly differs from the assumed model, an initial recovery rate selector (IRRS) is used to speed convergence to the normal operating point. FIG. 6 is a block diagram of a congestion controller including a dual PD controller with a low/high gain filter coefficient selector 60 and an initial recovery rate selector 70.

Figure 10:
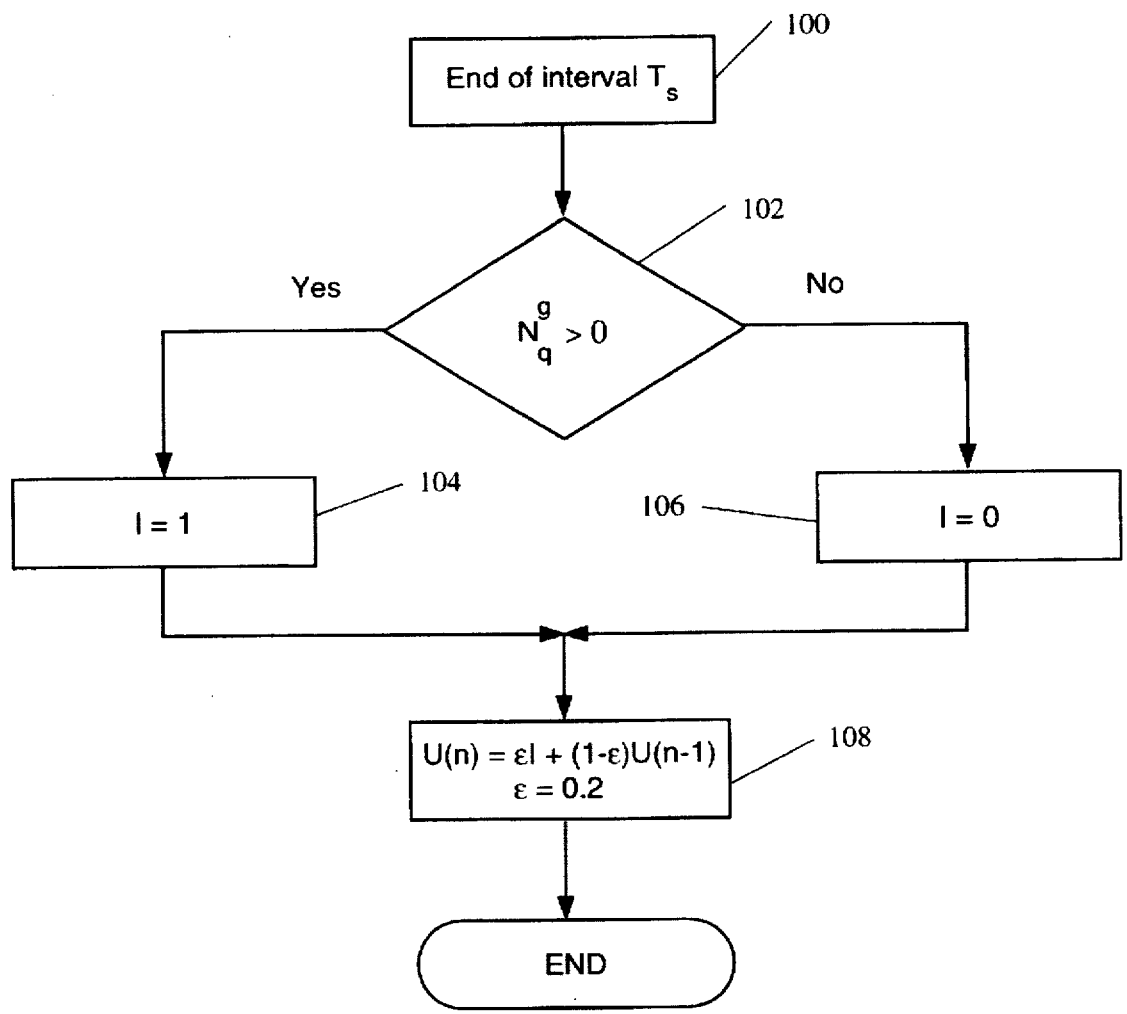
FIG. 10 is a flow diagram of a method for computing link utilization.

The congestion controller is executed once every $T_S$ msec. First, the controller reads the number of cells in the global queue, $N_g^q(n)$. This information is then provided to the initial recovery rate selector 70 as will be described below in conjunction with FIG. 7 and which sets the IRRS variable. When IRR=0, the new explicit rate R(n+1) is obtained from the high or low gain filter operations; otherwise the new explicit rate is computed from the initial recovery rate selector block as IRR (n+1) which will also be described in conjunction with FIG. 7. Consider the case when the explicit rate is computed by either the low or the high gain filter. Before any filter operations is performed, it is necessary to determine which filter to use. The filter coefficient selector 60 requires two inputs: the total number of cells in the global queue and the port utilization. A method for computing the port utilization based on queue fill is shown in FIG. 10. If the port utilization is not greater than a predetermined value, for example, 70% and $N_q^g(n)$ is not greater than $T_{GL}$, the selector 60 will select high gain filter coefficients; otherwise, the low gain filter coefficient will be selected. The output of the low/high gain filter coefficient selector 60 is a vector of coefficients: $\alpha_0^P, \alpha_1^P, \beta_0^P, \ldots, \beta_D^P$ where a superscript p denotes a filter type (low or high gain). The last step in the controller implementation is filter equation $$R_q(n+1) = R_q(n) - \sum_{j=0}^{1} \alpha_j^p e(n-j) - \sum_{j=0}^{D} \beta_j^p R_q(n-j).$$

The only new input is the error between the number of cells in the global queue, $N_q^g(n)$, and the reference threshold level, $N_0$, denoted by e(n), ($e(n)=N_q^g(n)-N_0$). This operation is performed by comparator 61 at the input of the filter diagram block. The blocks with $z^{-1}$ represent a delay of $T_S$ msec. For example, an error e(n−1) represents the difference between the number of cells in the global queue and the reference threshold level computed at the previous sampling interval. The next step in the process is to multiply e(n) by the coefficient $\alpha_0^p$ in multiplier 62 and e(n−1) by $\alpha_1^p$ in multiplier 63. Both products are added to form a new value of R(n+1) at adder 64. This completes the realization of the sum $$\sum_{j=0}^{1} \alpha_j^p e(n-j)$$

in the immediately above equation. The right hand side of the figures shows the obtaining of the sum $$R_q(n) - \sum_{j=0}^{D} \beta_j^p R_q(n-j).$$

This is done as follows: $R_q(n)$ is multiplied in multiplier 65 by $1-\beta_0^p$ added at adder 64 to $R_q(n+1)$, $R_q(n-1)$ is multiplied by $\beta_1^p$ in multiplier 66 at adder at adder 64 to $R_q(n+1)$, and so on until the last rate $R_q(n-D)$ is multiplied by $\beta_D^p$ in multipier 67 and added at adder 64 to $R_q(n+1)$. The newly computed explicit rate $R_q(n+1)$ cannot be negative or greater than the available capacity for ABR service. These conditions are strictly enforced by a limiter 68.

Figure 7:
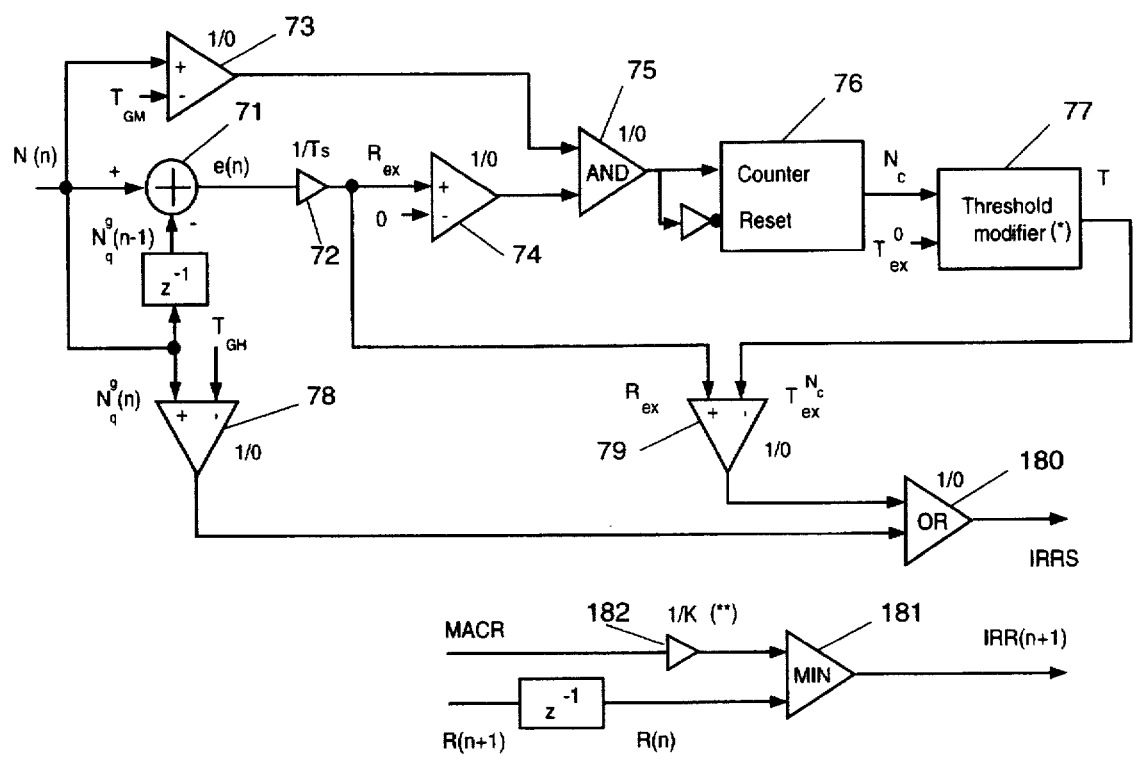
FIG. 7 is a block diagram of an initial recovery rate selection forming a component of the controller shown in FIG. 6.
Figure 11:
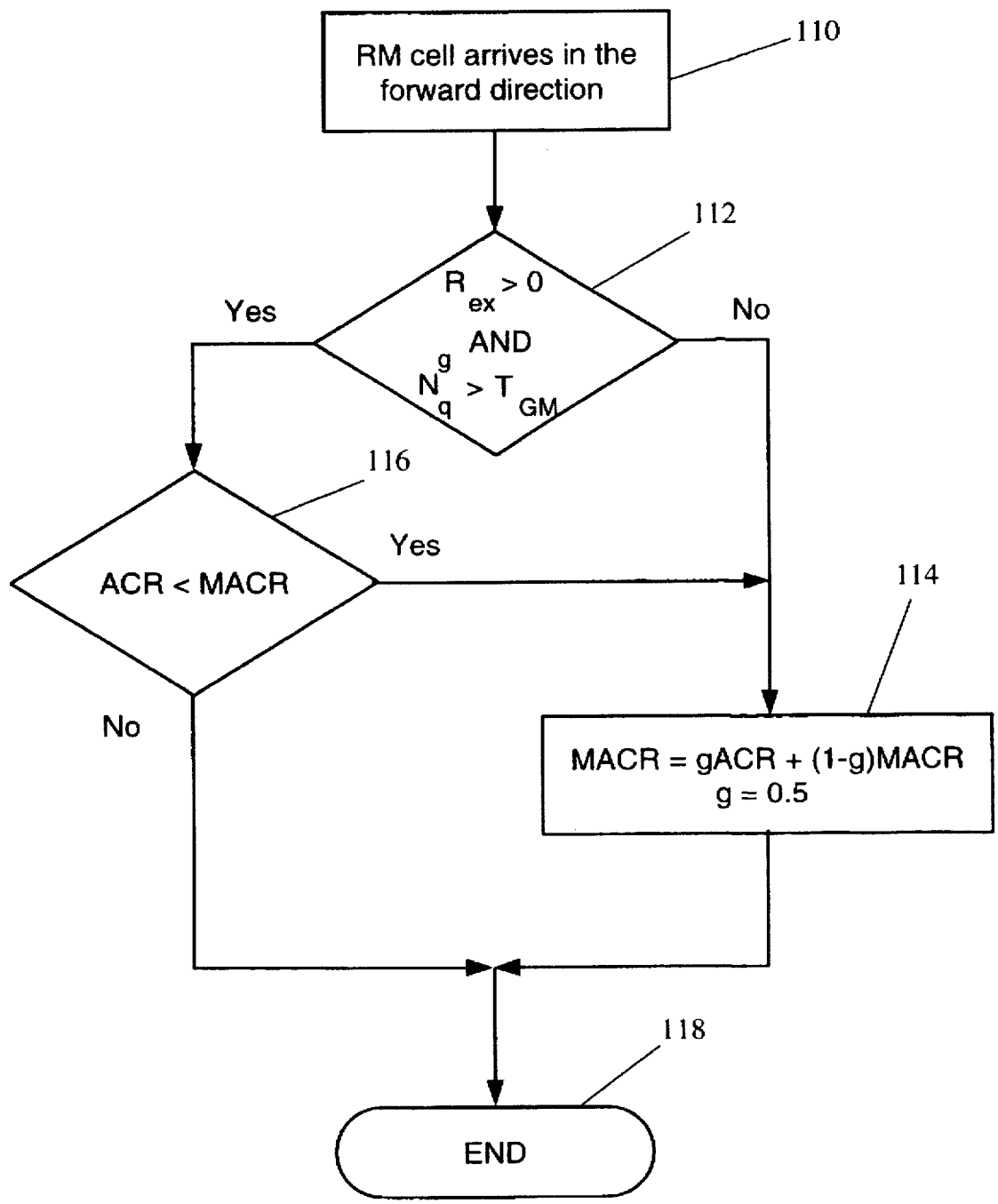
FIG. 11 is a flow diagram of a method for RM cell processing in the forward direction.

FIG. 7 is a block diagram of the initial recovery rate selector 70 which is executed at the beginning of the congestion controlled operation. The primary function of the IRRS is to detect severe congestion conditions due to either an increase in the number of active users on the network or a decreased availability of network capacity. When severe congestion is detected, the IRRS computes a new initial rate value for a low/high gain filter which will be used after the congestion disappears. The inputs to the IRRS block are the number of cells in the global queue, $N_q^g(n)$, the moving average of current cell rates, MACR, obtained from forward RM cells, and the rate $R_q(n)$ computed at the previous sampling interval. The IRRS block monitors the global queue size and the rate of queue growth, expressed by the excess rate $R_{ex}$. The IRRS block first computes in block 71 the difference e(n) between the current number of cells in the global queue and the number of cells in the global queue at the previous interval ($e(n)=N_q^g(n)-N_q^g(n-1)$). The error e(n) is then multiplied by $1/T_S$ in multiplier 72 in order to obtain the excess rate $R_{ex}$. The next step is the computation of the adaptive threshold for $R_{ex}$, denoted by $T_{ex}^{N_c}$. First $N_q^g(n)$ is compared to $T_{GM}$ in comparator 73. If $N_q^g(n)$ is not less than $T_{GM}$, the output of comparator 73 is 1; otherwise, the output is 0. At the same time the excess rate $R_{ex}$ is compared to 0 in comparator 74, and the output of comparator 74 (1/0) is provided as one input to the AND circuit. The other input to AND circuit 75 is the output of the comparator 73. The output of the AND circuit 75 is 1 if both inputs are 1; otherwise the output is 0. The output of AND circuit 75 is provided as the input of the counter 76 which operates as follows: when the input to the counter is 1, the output variable $N_c$ is increased by 1, and when the input becomes 0, $N_c$ is reset to 1. A threshold modifier 77 has at its two inputs, $N_c$ and a constant $T_{ex}^0$, and computes the threshold $T_{ex}^{N_c}$ for $R_{ex}$ according a linear law (Eq. 11). The threshold $T_{GH}$ for the number of cells in the global queue is constant. The next step is to compare $N_q^g(n)$ to $T_{GH}$ in comparator 78. If $N_q^g(n)$ is not less than $T_{GH}$, of the output of comparator 78 is 1; otherwise, the output is 0. At the same time, $R_{ex}$ is compared in comparator 79 to $T_{ex}^{N_c}$. The outputs of these two comparators 78,79 are provided as inputs to OR circuit 180. When both inputs to OR circuit 180 are 0, the output (IRRS) is 0; otherwise, IRRS is set to 1. If IRRS is set to 1, the new explicit rate, $R_q(n+1)$, is computed in the IRRS block; otherwise, the rate is computed by either a low gain or a high gain filter. The the new explicit rate is computed in IRRS 70, $R_q(n+1)$ is the minimum as determined in MIN 181 of $R_q(n)$ (previous rate that is computed in the IRRS block) and the moving average rate, MACR, multiplied by the constant 1/K in multiplier 182. The constant K is computed by and it approximates the degree of queue congestion. The algorithm for computing the moving average of current cell rates from forward RM cells is shown in FIG. 11.

Figure 8:
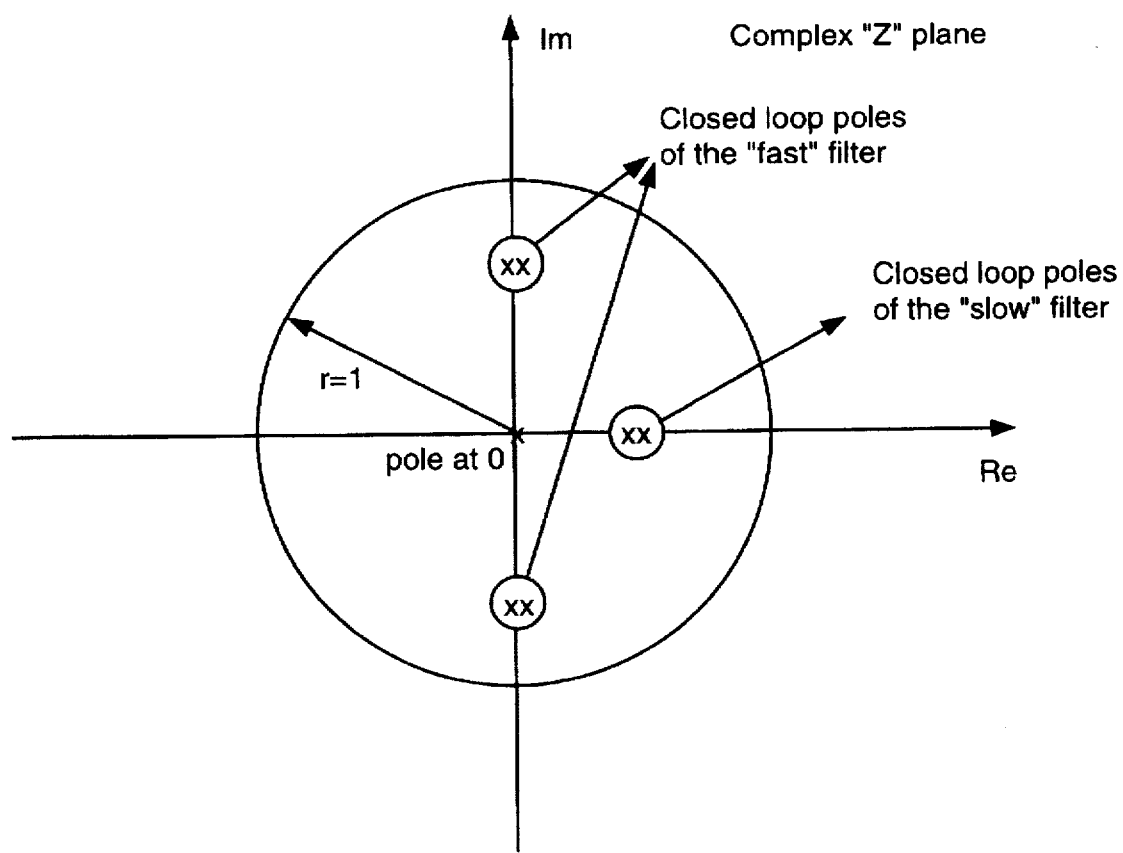
FIG. 8 is a polar diagram showing the preferred location of the poles in a unit circle for high and low gain controllers.

As shown in FIG. 7, the initial recovery rate selector monitors the current queue fill and the excess rate, and detects the condition when the queue is moderately congested (QMC=1), or severely congested (QSC=1). In either case, the IRR selector sets the initial recovery rate status IRRS=1. As shown in FIG. 6, the dual controller computes a new rate based on the current and past queue fill, as well as the past rates. The underload detector detects the condition when the queue is underloaded and causes the controller to use the high gain coefficients. Under normal conditions, when the utilization is high and the queues are small, the underload detector forces the controller to use the low gain coefficients. Finally, the selector selects either the rate computed by the controllers or the rate determined by the initial recovery rate selector, based on whether the queue is congested or not (QMC=1 or QSC=1). The rate so chosen is the common rate $R_q$. This rate is stored in the controller for future use. FIG. 8 shows the preferred locations of the poles in the unit circle for the high and low gain controllers. Thus, by switching between the high and low gain controllers, it is possible to obtain simultaneously good transient (fast rise time) and good steady state (fast settling time with minimal oscillations) responses of the controller 50.

Figure 9:
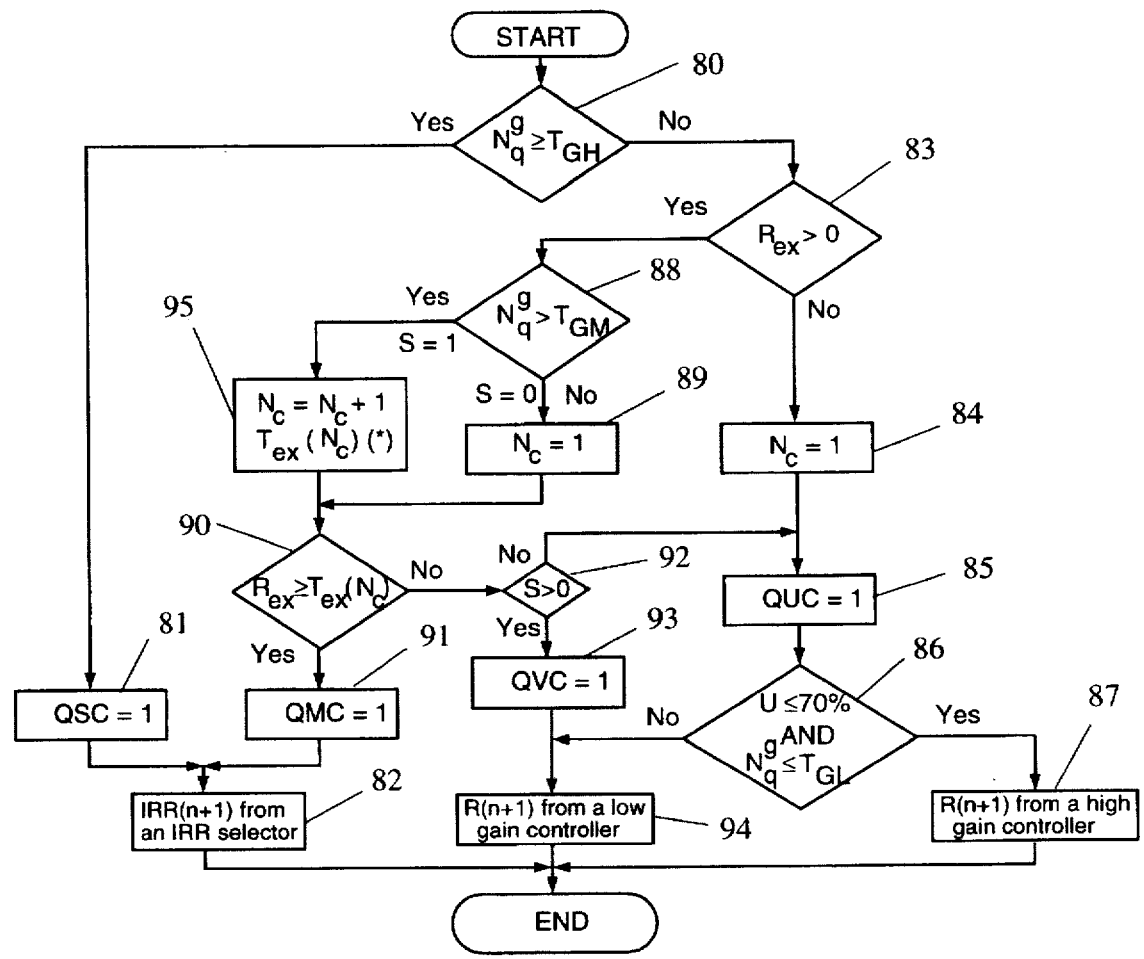
FIG. 9 is a flow diagram of a congestion control algorithm for controlling the controller shown in FIG. 6.

The high and low gain controllers are switched preferably in accordance with the congestion control algorithm shown in block diagram form in FIG. 9. The process $P_F$ is invoked once every $T_S$. The process first obtains the global queue fill $N_q^g$ and determines if the system is normal, congested or underloaded. When there is not congestion and the system is functioning normally, (i.e., the utilization is high and the queue sizes are controlled and small), the low gain controller determines the common rate $R_q$.

When congestion arises, either because the number of active sources have increased or the aggregate input rate has increased or the available capacity decreases, the global queue begins to grow. Congestion is detected by monitoring the global queue size and the rate of growth of queue. The rate of growth of queue is based on the excess rate $R_{ex}$, which is the same as the difference between at the rate at which ABR traffic is arriving and the rate at which ABR traffic is being served. Note $R_{ex}$ can be positive or negative. If it is positive, the queue is growing. If it is negative, the queue is shrinking. For output port q, the excess rate is $$R_{ex} = \frac{[N_q^g(n) - N_q^g(n-1)]}{T_S} .$$

The detection of congestion and the subsequent action taken depends on the state of the queue and the value of the excess rate. The global queue can be in one of three states.

1. QL—The global queue is low, if the global queue fill $N_q^g \leq T_{GM}$=(preferably about 100 cells).
2. QM—The global queue is moderate, if $T_{GM} < N_q^g < T_{GH}$.
3. QF—The global queue is full, if $N_q^g \geq T_{GH}$= (preferably about 1000 cells).

Define the following states for the excess states:

1. ERN—Excess rate is negative or zero. That is, $R_{ex} \leq 0$
2. ERM—Excess rate is moderate. That is, $0 < R_{ex} < T_{ex}$ (Nc)
3. ERH—Excess rate is high. That is, $R_{ex} \geq T_{ex}(Nc)$.

Finally, define the following congestion rates:

1. QUC—Queue uncongested
2. QVC—Queue on the verge of congestion
3. QMC—Queue moderately congested
4. QSC—Queue severely congested The following actions are taken based on the state of the global queue and the value of the excess rate.

Queue Uncongested (QUC=1) and Queue On Verge of Congestion (QVC=1)

If the excess rate $0 < R_{ex} < T_{ex}(N_c)$, and the global queue $N_q^g > T_{GM}$ is preferably more than about 100 cells, that is, ERM=1, QMC=1, the queue is declared to have a potential for congestion and the status QVC (queue on the verge of congestion) is set (QVC=1). Otherwise, the status is cleared (QVC=0) and the queue is declared uncongested QUC=1. If QVC=1, then the NIS (no increase) status is set to 1. This causes the NI bit in the returning RM cell to be set to 1 by the process $P_R$. Setting of the NI bit will prevent the sources from increasing their rate further.

If this condition persists, that is, QVC=1, then the excess rate threshold $T_{ex}(N_c)$ is reduced with time, preferably according to a linear law, as follows:

$$T_{ex}(N_c) = \max \left[ \frac{T_{ex}(0)}{(N_{max} - 1)} (N_{max} - N_c), 1 \right] \quad (11)$$

where $T_{ex}(0)$ is arbitrarily set to approximately 0.3 $C_{abr}$, and $N_c$ is the number of consecutive slots during which time QVC is set to 1. $N_{max}$ is the maximum number of time slots in which the excess rate threshold $T_{ex}(N_c)$ reduces to 0, preferably approximately 20. In the above description, a linear mechanism was used to reduce the excess rate threshold as a function of the number of consecutive slots during which the queue is on the verge of congestion. Since QVC is computed every $T_S$ msec., the excess rate threshold can fall to zero in $N_{max} T_s$ msec. Note that QVC is reset to 0 and $N_c$ is set to 1 the first time the conditions specified above are not met. The values given in these and other equations are preferred values, but are not critical. Other, similar values may be chosen in practicing the invention in order to obtain satisfactory results.

If the rate of growth of queue exceeds a threshold $T_{ex}(N_c)$, then the port is declared to be moderately congested and QMC=1. In this case, the common rate $R_q(n)$ is set to an initial recovery rate IRR(n) by an Initial Recovery Rate Selector function. The new common rate $R_q(n)$=IRR(n) will always be less than the previous common rate $R_q(n-1)$. That is, $$R_q(n) = \min(IRR(n), R_q(n-1)) \quad (12)$$

This new rate, referred to as the initial rate if chosen correctly, will result in quick convergence to the normal operating point. A preferred choice for the initial rate is $I(n) < C_{abr}/(2\bar{N})$, where $C_{abr}$ is the available capacity for ABE and $\bar{N}$ is the number of active ABR VCs. Alternatively, the initial rate may be set equal to zero. This would allow the global queue to fall to zero quickly, but will also increase the time for the normal operating point to be restored. The high gain controller in fact is used to reduce this time. However, a proper choice of the initial rate will reduce this time further. Determination of the initial rate without tracking the number of active ABE users $\bar{N}$ is described below:

If $R_{ex} > 0$ and the global queue $N_q^g > T_{GM}$, the NIS status is set as NIS=1. Otherwise, NIS=0.

If $R_{ex} \geq T_{ex}$ AND $N_q^g < T_{GH}$, set NIS=1.

Note that if $N_q^g \geq T_{GH}$, NIS=X.

If the global queue exceeds a threshold value of $T_{GH}$ of approximately 1000 cells, the port is declared to be severely congested, QSC=1. In this case, in addition to setting the current rate $R_q(n)$ equal to the initial rate IRR(n), the congestion indicator status CIS is set equal to 1. The last two actions will reduce the aggregate ABR rate after one round trip time, and the queue will begin to fall.

Table 1 shows the various congestion states and their relation to the global queue fill and excess rate.

| | Global Queue | AND | Excess Rate | Queue State |
|---|---|---|---|---|
| 1 | $N_q^g < T_{GH}$ | | $R_{ex} \leq 0$ | QUC |
| 2 | $N_q^g \leq T_{GM}$ | | $0 < R_{ex} < T_{ex}$ | QUC |
| 3 | $T_{GM} < N_q^g < T_{GH}$ | | $0 < R_{ex} < T_{ex}$ | QVC |
| 4 | $N_q^g < T_{GH}$ | | $R_{ex} \geq T_{ex}$ | QMC |
| 5 | $N_q^g \geq T_{GH}$ | | | QSC |

Table 2 lists the various actions. In the table, HLC refers to the rate obtained from the high/low gain controller, IRR refers to the rate obtained from the initial recovery rate selector, and QUC means the queue is uncongested.

|  | Queue State | | |
| --- | --- | --- | --- |
| Excess Rate State | QL | QM | QF |
| ERN | QUC | QUC | QSC |
|  | HLC | HLC | IRRS=1 |
|  | CIS=0 | CIS=0 | CIS=1 |
|  | NIS=0 | NIS=0 | NIS=X |
| ERM | QUC | QVC | QSC |
|  | HLC | HLC | IRRS=1 |
|  | CIS=0 | CIS=0 | CIS=1 |
|  | NIS=0 | NIS=1 | NIS=X |
| ERH | QMC | QMC | QSC |
|  | IRRS=1 | IRRS=1 | IRRS=1 |
|  | CIS=0 | CIS=0 | CIS=1 |
|  | NIS=1 | NIS=1 | NIS=X |

Once congestion subsides through control of source rates, an underload state may result if the combined source rates have fallen below the current ABR capacity $C_{abr}$. A similar condition may result if a source operating at a high rate becomes idle, or the available capacity for ABR increases suddenly. While the low gain controller can detect this condition, it will respond slowly to increase the rates. In order to quickly increase the rates and keep the utilization high, the high gain controller is used. If the global queue falls to below $T_{GL}$, preferably equal to approximately 3 cells, and the utilization of the link is less than U, preferably equal to approximately 70%, the queue is declared to be underloaded. The high gain controller is switched in, and the new common rate $R_q(n)$ is obtained from this controller. Under normal operations, the global queue fill must converge around $N_O$ cells. When the link utilization exceeds U=70% for example, the high gain controller is switched off and subsequent values for the common rate are obtained from the low gain controller. Note that there is truly only one controller. When computing $R_q(n)$, either the high or low gain coefficients are used.

Referring to FIG. 9, the global fill $N_q^g$ is compared 80 to a threshold value to $T_{GH}$. If the global fill is greater than or equal to the threshold value, the queue is considered severely congested 81 and IRR (n+1) is calculated from an IRR selector 82 and the process ends.

If the global fill is less than the threshold value, the sign of excess rate $R_{ex}$ is determined 83. If the excess rate is zero or negative, the excess rate threshold $N_c$ is set equal to 1 84, the queue is uncongested (QUC=1) 85 and if the utilization U is less than or equal to a predetermined value, preferably 70 percent and the global fill $N_q^g$ is less than or equal to a threshold $T_{GL}$, then new excess rate R(n+1) is determined from a high gain controller 87 and the process ends. If either or both conditions are not met, the value R(n+1) is determined from a low gain controller 94 and the process ends.

If the excess rate is greater than zero, a comparison 88 is made to determine whether the global fill $N_q^g$ exceeds a threshold $T_{GM}$. If not, the excess rate $N_c$ is set to 1 89. Then a comparison 90 is made whether the excess rate $R_{ex}$ is greater than a final $T_{ex}(N_c)$. If so, the queue is moderately congested 91, QMC=1 and the value IRR(n+1) is calculated from IRR selector 82.

If $R_{ex}$ is less than $T_{ex}(N_c)$, a determination is made 92 whether status bit, S, is greater than zero. If S is not greater than zero, the queue is uncongested 85 and the QUC=1 and the process proceeds as described above.

If S is greater than zero, the queue is on the verge of congestions 93, QVC=1 and the value $R_q(n+1)$ is calculated using a low gain controller and the process ends.

If the global fill is greater than $T_{GM}$ 88, the excess rate threshold count $N_c$ is incremented by one and $T_{ex}(N_c)$ is calculated 95. The process continues as described above with the determination whether the excess rate $R_{ex}$ as greater than or equal to $T_{ex}(N_c)$ 90 as described above.

The algorithm proceeds as follows:

Check if the global queue $N_q^g$ greater than or equal to the global high threshold $T_{GH}$.

---

If $N_q^g \geq T_{GH}$, then
{ the queue is severely congested and Set QSC=1.
}
If $N_q^g < T_{GH}$, then
{ check if the excess rate (difference between the input rate and available ABR capacity
$C_{abr}$) $R_{ex} > 0$.
If $R_{ex}$ is less than or equal to 0,
{ set the counter value $N_c$ to 1.
The queue is uncongested and set QUC=1.
}
If $R_{ex}$ is greater than 0,
{ check if the global queue $N_q^g$ is greater than $T_{GM}$ ($T_{GM} < T_{GH}$).
If the global queue $N_q^g$ is greater than $T_{GM}$, then
{ set status bit S=1.
increment the counter $N_c$ by 1 ($N_c = N_c + 1$)
Compute the new value of the excess rate threshold $T_{ex}(N_c)$ using equation (11).
Check if excess rate $R_{ex}$ is greater than or equal to the excess rate threshold $T_{ex}(N_c)$.
Note that the excess rate threshold $T_{ex}(N_c)$ decreases as $N_c$ increases.
If the excess rate $R_{ex}$ is greater than or equal to $T_{ex}(N_c)$, then
{
The queue is moderately congested and set QMC=1
}
If the excess rate $R_{ex}$ is less than $T_{ex}(N_c)$,
{ check if the status bit S=1. If S=1, the queue is on the verge of congestion, and set QVC=1.
If the status bit S=0, then the queue is uncongested and set QUC=1.
}
}
If the global queue $N_q^g$ is less than or equal to $T_{GM}$, then
{ set the status bit S=0 and the counter $N_c = 1$.
Compute the value of the excess rate threshold $T_{ex}(N_c)$ using equation (11). Check if excess rate $R_{ex}$ is greater than or equal to the
excess rate threshold $T_{ex}(N_c)$.
Note that the excess rate threshold $T_{ex}(N_c)$ decreases as $N_c$ increases.
If the excess rate $R_{ex}$ is greater than or equal to $T_{ex}(N_c)$, then
{
The queue is moderately congested and set QMC=1.
}
If the excess rate $R_{ex}$ is less than $T_{ex}(N_c)$,
{ check if the status bit S=1. If S=1, the queue is on the verge of congestion, and set QVC=1.
If the status bit S=0, then the queue is uncongested and set QUC=1.
}
}
}
}

---

In summary, the high and low gain controller are switched off and the common rate is obtained from the initial rate selector when the global queue fills rapidly due to a transient overload (an overshoot). This sudden decrease in rate will result in an undershoot leading to emptying of the buffers and loss of utilization. The high gain controller activates at this point and cause the rate to increase to the new value quickly. As soon as the link utilization has been restored to a high value of about U=70% for example, the high gain controller switches off and the slower low gain controller resumes control.

The link utilization must be monitored in order to switch to the high gain controller. Since utilization is the ratio of the arrival rate at the input to the available ABR capacity, this would require that these two quantities be measured. However, it is possible to obtain an estimate of the link utilization based on the queue size as described below.

The first step in the controller design procedure is to develop an appropriate model of the system. Assume that $R_q(n+1)$ is the common rate computed at time $t(n)$ by the output port $q (q=1,2, \ldots ,K)$. Then, during the time slot $n+1[t(n),t(n+1)]$, the source rate or admission rate $R_q(n,i)$ of the ith VC, $(i=1,2, \ldots ,M)$ that shares port q with M−1 other VCs is computed as follows:

$$R_q*(n,i)=\min(R_q(n+1-T_{di}), R(0,i))$$

where $T_{di}$ is the one way propagation delay between port q and the source of VC i (the propagation delay is expressed in number of slots, each of duration $T_S$), and $R(i,0)$ is the current or offered source rate of VC i. If $R_q(n+1-T_{di})$ is greater than $R(0, i)$, VC i is bottlenecked at some other output port along its path. Assume that there are (M−L) VCs bottlenecked at other switches and L VCs that are bottlenecked locally at port q. Also assume that the maximum one way propagation delay in the network is $T_d^{max}$, so that the largest round trip delay expressed in time slots is given by $$J=2T_d^{max}/T_S$$

Now the model of output port buffer containing L locally bottlenecked VCs and (M−L) VCs that are bottlenecked at other switches is:

$$N_q^s(n+1) = N_q^s(n) + \sum_{j=0}^{J} l(j,n)R_q(n+1-j) + R_0 - C_{abr} \quad (13)$$

where $l(j,n)$ is the number of VCs with round trip delay equal to j slots that are bottlenecked at port q at time n, and $R_0$ is the sum of the rates of (M−L) VCs that are bottlenecked at other switches. Note that $$\sum_{j=0}^{J} l(j,n) = L$$

The control algorithm is defined by the following equation:

$$R_q(n+1) = R_q(n) - \sum_{j=0}^{1} \alpha_j(N_q^s(n-j) - N_0) - \sum_{j=0}^{J} \beta_j R_q(n-j) \quad (14)$$

Equations 13 and 14 represent the closed loop system equations. The desired dynamics of the system is ensured by the appropriate choice of the control gains α and β. The control gains α and β should satisfy the following conditions:

$$\sum_{j=0}^{1} \alpha_j > 0, \sum_{j=0}^{J} \beta_j = 0.$$

For any given $l(0),l(1), \ldots ,l(J)$, one of the closed loop poles must be located at the origin of the unit circle, and the remaining (J+2) poles can be chosen at will. The input parameters in the controller design procedure are: the number of throttled flows $l(0), l(1), \ldots , l(J)$ and the locations of (J+2) closed loop poles. The result of the controller design procedure is the vector of control gain coefficients α and β.

The controller design procedure described above assumes that parameters $l(0),l(1), \ldots ,l(J)$ are fixed and are known. In any real network environment, the number of throttled or bottlenecked sources varies with time. Thus, the two controllers are designed for two different sets of parameters $l(i)(i=0,1, \ldots , J)$'s and closed loop poles. The choice of values for $l(i)(i=0,1, \ldots J)$ is such that the controller is robust in the steady state regime for all reasonable traffic scenarios.

The following is a description of the implementation of an input-output buffered switch.

In the basic method, the algorithm that computes the explicit rate at the switch only uses the queue length of the input and output buffers. In addition, an estimate of the ABR capacity and the utilization of this ABR capacity are needed.

The maximum value of the common rate R(n) must be limited to the available ABR capacity $C_{abr}$. Since only an estimate of the available capacity is needed, it is possible to obtain the same information from the call admission controller (CAC) as follows:

$$C_{abr}=C_{Line}-\Sigma\lambda_{peak}^{cbr}-\theta\Sigma\lambda_{sustained}^{vbr}$$

with $1 \leq \theta \leq 2$ depending on the variance of the aggregate VBR traffic. The larger the variance of the VBR traffic, the larger will be the value of θ.

It is also necessary to how the utilization of the ABR capacity for switching the high gain controller. To measure utilization it is necessary to know the available ABR capacity and the aggregate input rate of ABR cell stream. However, a simpler method is to observe the queue length itself. FIG. 10 is a flow diagram of a method for computing link utilization by monitoring the queue fill. Let I be an indicator function. At the end of interval $T_S$, a determination is made regarding the status of the global queue 102. If the global queue is not empty then I=1, 104. If the global queue is empty then I=0, 106. This is measured once every $T_S$. Then, the utilization of output port q at time $t_n$ is calculated 108 from an exponential smoothing algorithm:

$$U(n)=\epsilon I+(1-\epsilon)U(n-1)$$

with ε preferably equal to approximately 0.2.

When the queue is overloaded, it is essential to reduce the rate. One method is to reduce the rate to zero. While this is a robust choice, it can reduce the utilization and increase the latency. Alternatively, an initial recovery rate is estimated from the current cell rate values carried in ACR field of each resource management RM cell in the forward direction. As each RM cell is received in the forward direction, process $P_F$ performs the following operation shown in FIG. 11. The operation shown computes the aggregate ABR rate from all sources.

When an RM cell arrives in the forward direction 110, a determination is made 112 if the excess rate computed from the last observation $R_{ex}>0$ and the global queue fill $N_q^s>T_{GM}$. If either condition or both conditions do not exist, calculate 114 a new value for the mean allowed call rate MACR from the equation.

$$MACR=g\ ACR+(1-g)MACR$$

where g is preferably equal to 0.5.

If both conditions exist at step 112, determine 116 if the allowed cell rate ACR in the RM cell is less than the current mean value rate MACR. If ACR is less, calculate a new value for the mean allowed cell rate 114. If ACR is not less from the mean allowed cell rate, the process ends 18 without calculating a new means allowed cell rate.

Then the initial recovery rate IRR is given by $$IRR=MACR/K,$$

where $$K = 1 + \max\left[\frac{R_{ex}}{T_{ex}(N_c)}, \frac{N_q^s}{T_{GH}}\right]$$

$R_{ex}$ is the excess rate and $T_{ex}$ is the excess rate threshold. Note that $R_{ex}$ can be computed from observing the queue. Finally, the common rate $R_q$ is given by $$R_q(n+1) = \min(R_q(n), IRR) \tag{15}$$

If the queue exceeds the high thresholds of the global queue, the logical queue at the input port or the total input queue, the $P_F$ process sets CIS=1 and NIS=1. The $P_R$ process that processes the RM cells in the reverse direction in turn sets the CI bit to 1 and the NI bit to 1 in the RM cells traveling in the backward direction as shown in FIG. 12.

When an RM cell arrives in the backward direction 120, a determination is made whether the queue is severely congested, QSC=1 121. If yes, congestion indicator bit, CI, is set to 1 and the no increase bit, NI, is set to 1 122. Then, a new value of the explicit rate is calculated 123 from the equation.

$$ER_{RM} = \min\{R + MCR, ER_{RM}\}$$

If QSC is not equal to 1, a determination 124 is made if the queue is on the verge of congestion, QVC=1 or if the queue is moderately congested, QMC=1. If either condition is present, no increase bit NI is set to 1 125. Then, or if either of the above conditions does not exist, a determination 126 is made whether $N_{pq}^{in} \geq T_{h1}$ or $N_p^{in} \geq T_{h2}$. If either condition exists, congestion indication bit, CI is set to 1 127 and the new value of the explicit rate $ER_{RM}$ is calculated 123. If neither of the two conditions exists, a new value of explicit rate $ER_{RM}$ is calculated 123.

The setting of the CI bit will cause further reduction in the source rate. In conjunction with the CI bit it is not essential that there be an accurate estimate of the initial rate. This method is based upon exponential averaging and in combination with the use of the CI bit provides an adequate solution. The choice of setting the CI bit is made at every RM cell time in the backward direction.

The CI bit can be set if CIS=1:

a. The global queue $Q_q^g$ is severely congested. That is, $N_q^s \geq T_{GH}$ and hence CIS=1. The CI bit is set for all ABR cells using output port q.

b. The logical ABR queue $Q_{pq}^{in}$ of input port p is congested. That is, $N_{pq}^{in} \geq T_{h1}$. In this case, the CI bit is set for only those queues that use this logical queue.

c. The total ABR queue $Q_p^{in}$ at input port p is congested. That is, $N_p^{in} \geq T_{h2}$. The CI bit is set for all ABR cells using the input port p.

The following is a numerical example to provide a clearer understanding of the invention.

Round trip propagation delay is 1 millisecond (100 Km). Sampling time is $T_S$=0.5 msec.
J=1/0.5=2. Thus, only the values $\beta_0$, $\beta_1$ and $\beta_2$ are necessary.

| No. | Parameter | Low Gain Controller | High Gain Controller |
|-----|-----------|---------------------|----------------------|
| 1 | $\alpha_0$ | +0.0125 | +0.0778 |
| 2 | $\alpha_1$ | −0.0100 | −0.0444 |
| 3 | $\beta_0$ | +0.6875 | +0.8334 |
| 4 | $\beta_1$ | −0.4375 | −0.1667 |
| 5 | $\beta_2$ | −0.2500 | −0.6667 |

The control equation:

$$R(n+1) = R(n) - \alpha_0(N(n) - N_0) - \alpha_1(N(n-1) - N_0) -$$
$$\beta_0 R(n) - \beta_1 R(n-1) - \beta_2 R(n-2)$$

can be rewritten as:

$$R(n+1) = R(n) - (\alpha_0 + \alpha_1)(N(n) - N_0) - \alpha_1(N(n-1) -$$
$$N(n)) - \beta_0 R(n) - \beta_1 R(n-1) - \beta_2 R(n-2).$$

Substituting the values for the filter coefficient for the low gain filter:

$$R(n+1) = 0.3125R(n) - 0.0025(N(n) - N_0) + 0.0100\ (N(n) -$$
$$N(n-1)) + 0.4375R(n-1) + 0.2500R(n-2).$$

From this it will be seen that when R(n), R(n−1), R(n−2)=0, and N(n), N(n−1)=0
$R(n+1)=+0.0025N_0$
if $N_0$=50 cells,
$R(1)$=0.125 cells/slot or 0.1250 cells/$T_S$
$R(2)$=0.3125R(1)+0.0025N_0 0.164 cells/$T_S$.
Similarly, for the high gain filter $$R(n+1) = 0.1666R(n) - 0.0334(N(n) - N_0) + 0.0444(N(n) - N(n-1)) +$$
$$0.1667R(n-1) + 0.6667R(n-2).$$

Thus,
$R(1)$=1.67 cells/slot
$R(2)$=1.948 cells/slot
$R(3)$=2.273 cells/slot.

It has been assumed that under steady state, there would be 100 active VCs. Thus, the low gain filter rise time has been designed for 100 active VCs. The high gain filter is designed for 15 active VCs.

When the system is initialized, it is possible to start with all R(n)=R(n−1) ... =0, N(n)=N(n−1) ... =0.

Note that in most cases if there is severe congestion, the rate will decrease to an Initial Recovery Rate that is small, but greater than zero. Also, if the number of active VCs are larger than 1, the settling time will be small. Only when there is a single VC, and the congestion causes the rate to go to zero, will the convergence time be large. In fact, for the high gain filter to go from 0 to 350 cells/slot, it requires about 500 slots. At $T_S$=0.5 msec, this is 0.25 seconds. However, if there are 10 VCs, the convergence time to reach a rate of 35 cells/slot is about 54 slots or 27 milliseconds.

In order to compute the value ER, the following operations are performed at the beginning of every slot of length $T_S$. All discussions are with respect to output port q. Let the current time be t(n), and thus the beginning of interval (n+1). The values given in this algorithm are preferred values. It will be apparent to those skilled in the art that other values for the constants may be used to achieve satisfactory results when practicing the present invention.

1. Obtain the Global queue $N_q^g(n)$.
2. Obtain excess rate $$R_{ex} = \frac{[N_q^g(n) - N_q^g(n-1)]}{T_S}.$$

3. Obtain utilization U(n)=∈I+(1−∈)U(n−1) ∈=0.2
where
If $N_q^g$>0 I=1 ELSE I=0
4. IF $R_{ex}$>0 AND $N_q^g$>$T_{GM}$=100 cells, then QVC=1
Set $N_c$=$N_c$+1. Set NIS=1
ELSE Set $N_c=1$ and NIS=0.
Note: NIS is NI status. If NIS=1 set NI=1 in the BRM cell
5. Obtain $$T_{ex}(N_c) = \max\left[\frac{T_{ex}(0)}{(N_{max}-1)}(N_{max}-N_c), 1\right]$$

where $T_{ex}(0)=0.3C_{abr}$ and $N_{max}=20$. $C_{abr}$ is obtained from the CAC.
6. Obtain $$K = 1 + \max\left[\frac{R_{ex}}{T_{ex}(N_c)}, \frac{N_q^g}{T_{GH}}\right].$$

7. Obtain IRR=MACR/K.
Note MACR is computed from forward RM cell.
8. IF $N_q^g \geq T_{GH}=1000$ cells, then QSC=1
Set CIS=1 and NIS=1 OR X.
9. If $R_{ex} \geq T_{ex}(N_c)$ set NIS=1.
10. IF $R_{ex} \geq T_{ex}(N_c)$ OR $N_q^g \geq T_{GH}$
then COMMON RATE
$R_q(n+1)=\min(IRR,R_q(n))$
ELSE IF
$N_q^g \leq T_{GL}=3$ AND $U(n) \leq 0.7$
Compute $R_q(n+1)$ with HIGH GAIN Controller coefficients
ELSE
Compute $R_q(n+1)$ with LOW GAIN Controller coefficients.
11. $R_q(n+1)=\min(\max(R_q(n+1),0),C_{abr})$.
12. This value of $R_q(n+1)$ is the common rate and is saved.
13. Finally, for VC i the following is stamped in the BRM cell
$ER_q(n+1,i)=\min(R_q(n+1)+MCR(i),ER(\text{in cell}))$.
or
$ER_q(n+1,i)=\min(\max(R_q(n+1),MCR(i)),ER(\text{in cell}))$.
Computation of MACR
Every time a forward RM cell arrives:

```
IF (R_ex > 0 AND T_q^g > T_GM)
   IF (ACR < MACR)
      MACR = 0.5ACR + 0.5MACR
   ELSE
      MACR = 0.5ACR + 0.5MACR.
```

While there has been described and illustrated a preferred embodiment of the invention, it will be apparent to those skilled in the art that variations and modifications are possible without deviating from the broad principles and teachings of the present invention which shall be limited solely by the scope of the claims appended hereto.

What is claimed is:

1. A method of rate based feedback congestion control at an ATM switch for ABR service in an ATM network comprising the steps of:

determining a global queue fill $N_q^g$ at a sampling interval where g is the global queue of output port q;

computing a common rate $R_q$ based upon the global queue fill at sequential sampling intervals;

computing an explicit rate ER based upon said computed common rate for each virtual channel forming the ATM network, and controlling the transmission rate of individual virtual channels responsive to said computed explicit rate.

2. A method of rate based feedback congestion control at an ATM switch for ABR service as set forth in claim 1, where said computing a common rate $R_q(n+1)$ comprises combining a first value proportional to the difference between the global queue fill $N_q^g(n)$ and a predetermined buffer set point $N_0$, a second value proportional to the difference between the global queue fill and the prior global queue fill $N_q^g(n-1)$ and values proportional to J previous computed common rates with the computed common rate $R_q(n)$ where $J=2T_d^{max}/T_s$ and $T_d^{max}$ is the maximum one way propagation delay between a source and a destination that affects the switch and $T_s$ is the length of the time slot.

3. A method of rate based feedback congestion control at an ATM switch for ABR service as set forth in claim 1, where said computing a common rate includes using a high gain second order proportional plus derivatative controller and a low gain second order proportional plus derivatative controller.

4. A method of rate based feedback congestion control at an ATM switch for ABR service as set forth in claim 3, where said computing a common rate comprises determining a condition of the global queue fill, and controlling the common rate by selectively using a high gain second order proportional plus derivative controller or a low gain second order proportional plus derivative controller responsive to the condition of the global queue fill.

5. A method of rate based feedback congestion control at an ATM switch for ABR service as set forth in claim 1, where said computing a common rate comprises determining a condition of the global queue fill, and selecting an initial recovery rate in order to maintain the common rate such that the global queue fill has a value within predetermined limits.

6. A method of rate based feedback congestion control at an ATM switch for ABR service as set forth in claim 5, where the common rate is the lesser of the initial recovery rate or the common rate computed during the preceeding sampling interval.

7. A method of rate based feedback congestion control at an ATM switch for ABR service as set forth in claim 1, computing an excess rate $R_{ex}$ as the difference between the current determined global queue fill $N_q^g(n)$ and the previously determined global queue fill $N_q^g(n-1)$, the difference being divided by the sampling interval; comparing said computed excess rate to a predetermined excess rate threshold and when said computed excess rate exceeds the predetermined excess rate threshold, calculating a common rate using an initial recovery rate.

8. A method of rate based feedback congestion control at an ATM switch for ABR service as set forth in claim 1, further comprising determining if the global queue fill is empty, and calculating link utilization responsive to whether the global queue fill is empty.

9. A method of rate based feedback congestion control at an ATM switch for ABR service as set forth in claim 8, where said calculating link utilization is calculated by setting I=0 if the global queue fill is empty, otherwise setting I=1, and computing link utilization during interval n, as $$U(n)=\epsilon I+(1-\epsilon)U(n-1)$$

where $\epsilon$ is a constant and $U(n-1)$ is the link utilization calculated during the preceeding interval n-1.

10. A method of rate based feedback congestion control at an ATM switch for ABR service as set forth in claim 1, further comprising computing the explicit rate for a virtual channel i at interval n for port q as the maximum of the minimum cell rate of virtual channel i and the common rate at interval n for allocating bandwidth to the virtual channels forming the ATM network.

11. A method of rate based feedback congestion control at an ATM switch for ABR service as set forth in claim 1, further comprising computing the explicit rate for a virtual channel i at interval n for port q as the sum of the minimum cell rate of the virtual channel i and the common rate at interval n for allocating bandwidth to the virtual channels forming the ATM network.

12. An apparatus for rate based feedback congestion control at an ATM switch for ABR service in an ATM network comprising:

a plurality of virtual channels each having at least one output port means for determining a global queue fill $N_q^g$ at a sampling interval where g is the global queue of output port q;

means for computing a common rate $R_q$ based upon the global queue fill at sequential sampling intervals;

means for computing an explicit rate ER based upon said computed common rate for each virtual channel, and means for controlling the transmission rate of individual virtual channels responsive to said computed explicit rate.

13. An apparatus for rate based feedback congestion control at an ATM switch for ABR service as set forth in claim 12, where said means for computing a common rate $R_q(n+1)$ combines a first value proportional to the difference between the global queue fill $N_q^g(n)$ and a predetermined buffer set point $N_0$, a second value proportional to the difference between the global queue fill and the prior global queue fill $N_q^g(n-1)$ and values proportional to J previous computed common rates with the computed common rate $R_q(n)$ where $J=2T_d^{max}/T_s$ and $T_d^{max}$ is the maximum one way propagation delay between a source and a destination that affects the switch and $T_s$ is the length of the time slot.

14. An apparatus for rate based feedback congestion control at an ATM switch for ABR service as set forth in claim 12, where said means for computing a common rate comprises a high gain second order proportional plus derivatative controller and a low gain second order proportional plus derivatative controller.

15. An apparatus for rate based feedback congestion control at an ATM switch for ABR service as set forth in claim 14, where said means for computing a common rate comprises means for determining a condition of the global queue fill, and means for controlling the common rate by selectively using said high gain second order proportional plus derivative controller or said low gain second order proportional plus derivative controller responsive to the condition of the global queue fill.

16. An apparatus for rate based feedback congestion control at an ATM switch for ABR service as set forth in claim 12, where said means for computing a common rate comprises means for determining a condition of the global queue fill, and means for selecting an initial recovery rate in order to maintain the common rate such that the global queue fill has a value within predetermined limits.

17. An apparatus for rate based feedback congestion control at an ATM switch for ABR service as set forth in claim 16, where the common rate is the lesser of the initial recovery rate or the common rate computed during the proceeding sampling interval.

18. An apparatus for rate based feedback congestion control at an ATM switch for ABR service as set forth in claim 12, further comprising means for computing an excess rate $R_{ex}$ as the difference between the current determined global queue fill $N_q^g(n)$ and the previously determined global given fill $N_q^g(n-1)$, the difference being divided by the sampling interval; means for comparing said computed excess rate to a predetermined excess rate threshold and when said computed excess rate exceeds the predetermined excess rate threshold, means for calculating a common rate using an initial recovery rate.

19. An apparatus for rate based feedback congestion control at an ATM switch for ABR service as set forth in claim 12, further comprising means for determining if the global queue fill is empty, and means for calculating link utilization responsive to whether the global queue fill is empty.

20. An apparatus for rate based feedback congestion control at an ATM switch for ABR service as set forth in claim 19, where said means for calculating link utilization sets I=0 if the global queue fill is empty, otherwise sets I=1, and calculating link utilization during interval n, as $$U(n)=\epsilon I+(1-\epsilon)U(n-1)$$

where $\epsilon$ is a constant and $U(n-1)$ is the link utilization calculated during the preceeding interval n−1.

21. An apparatus for rate based feedback congestion control at an ATM switch for ABR service as set forth in claim 12, further comprising means for computing the explicit rate for a virtual channel i at interval n for port q as the maximum of the minimum cell rate of virtual channel i and the common rate at interval n for allocating bandwidth to said virtual channels.

22. An apparatus for rate based feedback congestion control at an ATM switch for ABR service as set forth in claim 12, further comprising means for computing the explicit rate for a virtual channel i at interval n for port q as the sum of the minimum cell rate of the virtual channel i and the common rate at interval n for allocating bandwidth to said virtual channels.

* * * * *